(12) United States Patent
Higuchi et al.

(10) Patent No.: US 11,393,383 B2
(45) Date of Patent: Jul. 19, 2022

(54) DISPLAY CONTROL DEVICE, DISPLAY CONTROL METHOD, AND DISPLAY CONTROL PROGRAM

(71) Applicant: Mitsubishi Electric Corporation, Tokyo (JP)

(72) Inventors: Hirohiko Higuchi, Tokyo (JP); Kenichi Ogawa, Tokyo (JP); Keiko Imamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/096,983

(22) Filed: Nov. 13, 2020

(65) Prior Publication Data

US 2021/0065609 A1 Mar. 4, 2021

Related U.S. Application Data

(63) Continuation of application No. PCT/JP2018/022603, filed on Jun. 13, 2018.

(51) Int. Cl.
*G09G 3/20* (2006.01)

(52) U.S. Cl.
CPC ......... *G09G 3/2088* (2013.01); *G09G 3/2092* (2013.01); *G09G 2360/06* (2013.01)

(58) Field of Classification Search
CPC ............... G09G 3/2088; G09G 3/2092; G09G 2360/06; G09G 2320/0693; G09G 5/20;
(Continued)

(56) References Cited

U.S. PATENT DOCUMENTS

| 6,906,634 B1 | 6/2005 | Kuenzner et al. | |
| 2008/0094418 A1* | 4/2008 | Gerlach | G01D 7/00 345/660 |

(Continued)

FOREIGN PATENT DOCUMENTS

| DE | 10 2004 045 094 B4 | 5/2012 |
| EP | 2 237 230 B1 | 6/2012 |

(Continued)

OTHER PUBLICATIONS

International Search Report and Written Opinion dated Sep. 18, 2018 for PCT/JP2018/022603 filed on Jun. 13, 2018, 6 pages including English Translation of the International Search Report.

(Continued)

*Primary Examiner* — Carolyn R Edwards
(74) *Attorney, Agent, or Firm* — Xsensus LLP

(57) ABSTRACT

A display control device includes: a circle setting unit that sets a reference circle that serves as the reference for a scale mark layout; a scale mark position determining unit that determines the position of a scale mark on the reference circle; a rectangle setting unit that sets a number display rectangle of the size corresponding to the number of digits of the indication number indicating the value corresponding to the scale mark; a rectangle position determining unit that determines the layout position of the number display rectangle from the position of the scale mark, using a calculating formula that has been set on the basis of the size of the reference circle and the size of the number display rectangle; and a number display unit that displays a number in the number display rectangle, and the calculating formula is designed so that, in a case where a straight line extending through the center of the reference circle on a display screen is set as a symmetrical axis, number display rectangles for displaying indication numbers indicating the values corresponding to scale marks disposed at positions symmetrical to each other are located at the same position as viewed from the direction of the symmetrical axis, and each number display rectangle is located at a layout position inscribed in the reference circle.

9 Claims, 15 Drawing Sheets

(58) Field of Classification Search
CPC ........ G09G 5/30; G09G 5/32; G09G 2380/06; G01D 7/00
See application file for complete search history.

(56) References Cited

U.S. PATENT DOCUMENTS

| | | | | |
|---|---|---|---|---|
| 2012/0162249 | A1* | 6/2012 | Tsuda | G09G 5/14 345/629 |
| 2012/0223964 | A1* | 9/2012 | Oishi | G01D 11/28 345/629 |
| 2017/0330463 | A1* | 11/2017 | Li | G08G 1/015 |
| 2021/0065609 | A1* | 3/2021 | Higuchi | G09G 5/32 |
| 2021/0197671 | A1* | 7/2021 | Devshatwar | B60K 35/00 |

FOREIGN PATENT DOCUMENTS

| | | | |
|---|---|---|---|
| JP | 2003-510586 | A | 3/2003 |
| JP | 2009-74808 | A | 4/2009 |
| JP | 2009-128308 | A | 6/2009 |
| JP | 2014-2554 | A | 1/2014 |

OTHER PUBLICATIONS

Indian Office action dated Sep. 9, 2021, in corresponding Indian Patent Application No. 202047050365, 6 pp.
Office Action dated Jan. 26, 2022, in corresponding Chinese patent Application No. 201880094458.4, 17 pages.

\* cited by examiner

Where $45° \leq \alpha \leq 135°$, and
$0° \leq \theta \leq 90°$

Where $-45° \leq \alpha \leq 45°$, and
$0° \leq \theta \leq 90°$ (State 1)

(State 2)

(State 3)

DISPLAY CONTROL DEVICE, DISPLAY CONTROL METHOD, AND DISPLAY CONTROL PROGRAM

CROSS-REFERENCE TO RELATED APPLICATION

The present application is a bypass continuation of and claims priority to PCT/JP2018/022603, filed on Jun. 13, 2018, the entire contents of which is incorporated herein by reference in its entirety.

TECHNICAL FIELD

The present invention relates to a display control device that causes a display screen to display a circular meter, a display control method, and a display control program.

BACKGROUND ART

Conventional display devices that display a circular analog meter are known.

For example, Patent Literature 1 discloses a display device that enlarges and emphasizes a numerical value displayed in a region around the current position of the pointer in a speedometer indicating a vehicle speed.

CITATION LIST

Patent Literature

Patent Literature 1: JP 2003-510586 W

SUMMARY OF INVENTION

Technical Problem

In a conventional technology as represented by a display device such as the one disclosed in Patent Literature 1, the layout of the numerical values displayed on the display device is not a layout that takes into consideration the balance of the overall layout on the screen.

The present invention has been made to solve the above problem, and aims to provide a display control device that enables a balanced display of numerical values indicating the values corresponding to the scale marks displayed on the screen of a display device that displays a circular meter.

Solution to Problem

A display control device according to the present invention includes processing circuitry to set a reference circle that serves as the reference for a scale mark layout; to determine the position of a scale mark on the reference circle; to set a number display rectangle of the size corresponding to the number of digits of the indication number indicating the value corresponding to the scale mark; to determine the layout position of the number display rectangle from the position of the scale mark, using a calculating formula that has been set on the basis of the size of the reference circle and the size of the number display rectangle; and to display a number in the number display rectangle, wherein the calculating formula is designed so that, in a case where a straight line extending through the center of the reference circle on a display screen is set as a symmetrical axis, number display rectangles for displaying indication numbers indicating the values corresponding to scale marks disposed at positions symmetrical to each other are located at the same position as viewed from the direction of the symmetrical axis, and each number display rectangle is located at a layout position inscribed in the reference circle.

Advantageous Effects of Invention

According to the present invention, numbers indicating the values corresponding to scale marks can be displayed in a well-balanced manner on a display device that displays a circular meter.

DESCRIPTION OF EMBODIMENTS

The following is a detailed description of embodiments of the present invention with reference to the drawings.

First Embodiment

A display control device according to a first embodiment is a display control device that causes a display screen to display a circular meter. A meter to be displayed under the control of the display control device may not be strictly circular, and its circular shape may be a substantially circular shape or a substantially fan-like shape. Note that, in the description below, a circular meter to be displayed by the display screen under the control of the display control device will be referred to simply as a "meter".

When causing the display screen to display a meter, the display control device first causes the display screen to display the scale marks of the meter. The display control device then causes the display screen to display the numbers (hereinafter referred to as the "indication numbers") indicating the values corresponding to the scale marks of the displayed meter. Note that the size of the indication numbers is set beforehand depending on the size of the display screen.

A meter to be displayed by the display screen under the control of the display control device is a meter that has a circular shape and indicates any kind of value measured with a sensor or the like, such as a meter mounted on a mobile structure, or a meter installed in a building. Note that a meter is not necessarily a meter that indicates a measured value, but may be a meter that indicates a value with a number, such as a clock that indicates time, for example.

Figure 1:
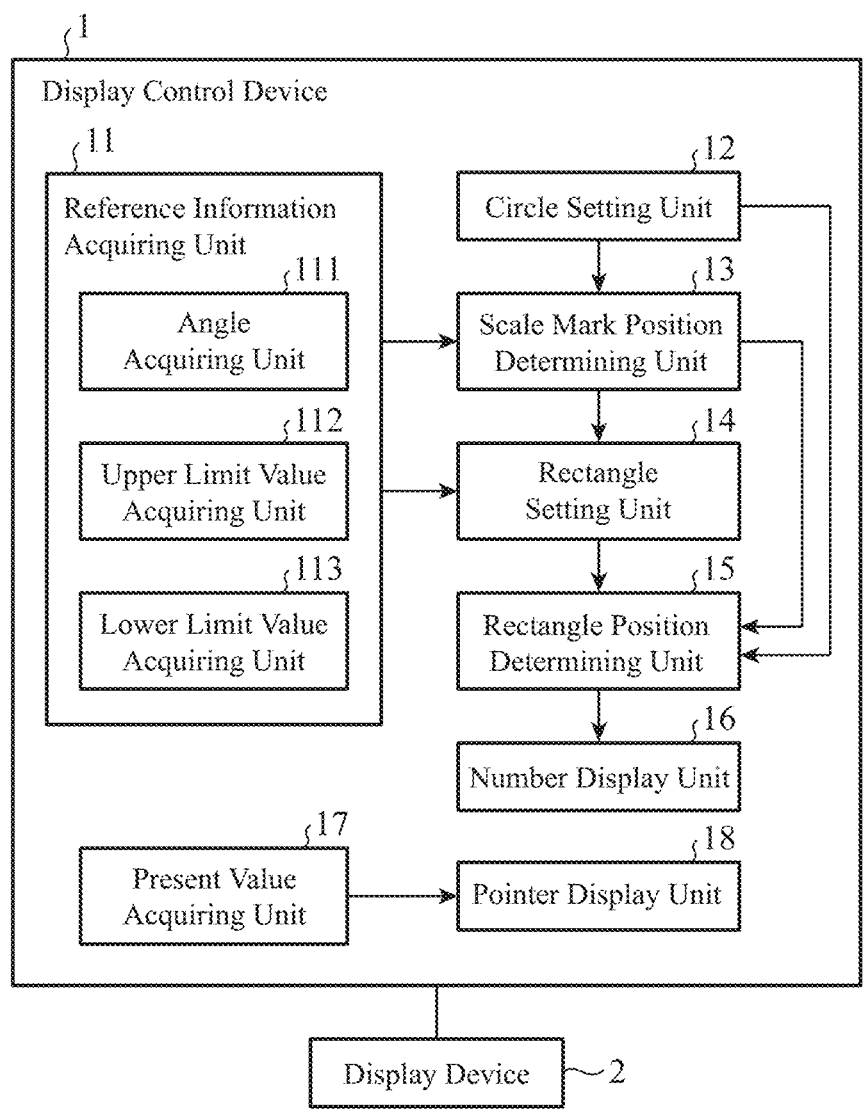
FIG. 1 is a diagram showing an example configuration of a display control device according to a first embodiment.

FIG. 1 is a diagram showing an example configuration of a display control device 1 according to the first embodiment.

The display control device 1 includes a reference information acquiring unit 11, a circle setting unit 12, a scale mark position determining unit 13, a rectangle setting unit 14, a rectangle position determining unit 15, a number display unit 16, a present value acquiring unit 17, and a pointer display unit 18.

The reference information acquiring unit 11 includes an angle acquiring unit 111, an upper limit value acquiring unit 112, and a lower limit value acquiring unit 113.

The display control device 1 is connected to a display device 2, and causes the display screen of the display device 2 to display a meter. Note that the display control device 1 may be mounted on the display device 2.

The reference information acquiring unit 11 acquires information that serves as reference for the meter to be displayed under the control of the display control device 1.

The angle acquiring unit 111 of the reference information acquiring unit 11 acquires the angle range in which scale marks are assigned to the meter.

The upper limit value acquiring unit 112 of the reference information acquiring unit 11 acquires the upper limit value of the values to be measured with the meter.

The lower limit value acquiring unit 113 of the reference information acquiring unit 11 acquires the lower limit value of the values to be measured by the meter.

For example, a user inputs, from an input device (not shown), the angle range, the upper limit value, and the lower limit value, and the angle acquiring unit 111, the upper limit value acquiring unit 112, and the lower limit value acquiring unit 113 acquires the angle range, the upper limit value, and the lower limit value input by the user, respectively.

The reference information acquiring unit 11 outputs the acquired angle range, upper limit value, and lower limit value to the scale mark position determining unit 13 and the rectangle setting unit 14, which will be described later.

Note that the angle range, upper limit value, and lower limit value described above are not necessarily designated by the user, but may be set in advance. In that case, the scale mark position determining unit 13 and the rectangle setting unit 14 may perform the later-described process on the basis of the preset angle range, upper limit value, and lower limit value, and the display control device 1 may not include the angle acquiring unit 111, the upper limit value acquiring unit 112, and the lower limit value acquiring unit 113.

In the first embodiment, the angle range is a range designated as "A to B degrees", with 0 degrees being a direction viewed from the center of the reference circle (described later), for example.

The circle setting unit 12 sets the reference circle that serves as the reference for the scale mark layout. Specifically, the coordinate position of the center of the reference circle serving as the reference for the scale mark layout on the display screen, and the radius of the reference circle are set. The display control device 1 performs control so that the meter is displayed on the reference circle set by the circle setting unit 12.

The scale mark position determining unit 13 determines the positions of scale marks on the reference circle set by the circle setting unit 12.

More particularly, the scale mark position determining unit 13 determines the positions of a plurality of scale marks on the reference circle, for the angle range acquired by the angle acquiring unit 111. Specifically, the scale mark position determining unit 13 determines the positions of scale marks on the reference circle by dividing the angle range acquired by the angle acquiring unit 111, so that the numerical values from the lower limit value to the upper limit value acquired by the lower limit value acquiring unit 113 and the upper limit value acquiring unit 112 are separated at regular intervals. Like the angle range, the position of a scale mark on the reference circle in the first embodiment is represented by an angle such as "A to B degrees" with 0 degrees being a direction viewed from the center of the reference circle, or a coordinate position on the display screen, for example.

The scale mark position determining unit 13 can also dynamically change the position of one or more scale marks among the plurality of scale marks. Specifically, the scale mark position determining unit 13 can redetermine the position of one or more scale marks, depending on a change in the angle range.

The scale mark position determining unit 13 outputs the determined scale mark position(s) to the rectangle setting unit 14 and the rectangle position determining unit 15.

The rectangle setting unit 14 sets a rectangle having the size corresponding to the number of digits of each indication number (this rectangle will be hereinafter referred to as the "number display rectangle").

Of the plurality of scale marks, for which scale mark the indication number indicating the value corresponding to the scale mark is displayed is determined depending on the upper and lower limit values of the values to be displayed on the meter, and the angle range in which the scale marks are assigned to the meter.

On the basis of the upper and lower limit values and angle range acquired by the reference information acquiring unit 11, the rectangle setting unit 14 determines the number of scale marks at which the indication numbers are to be displayed (these scale marks will be hereinafter referred to as the "numbered scale marks") and the positions of the scale marks.

In a case where there is a plurality of numbered scale marks, the rectangle setting unit 14 sets a number display rectangle for each numbered scale mark.

Further, in a case where the scale mark position determining unit 13 has changed the positions of the scale marks, the rectangle setting unit 14 determines the number of numbered scale marks and the positions of the numbered scale marks, depending on the positions of the scale marks after the scale mark position determining unit 13 has made the change.

For example, in a case where the user has input an instruction to change the angle range by operating the input device, and changed the angle range in which scale marks are assigned to the meter, the scale mark position determining unit 13 changes the positions of the scale marks from those prior to the change in the angle range depending on the change in the angle range, and redetermines the positions of the scale marks. Depending on the positions after the scale mark position determining unit 13 has made the change, the rectangle setting unit 14 determines the number of numbered scale marks and the positions of the numbered scale marks.

The rectangle setting unit 14 outputs information about the set number display rectangle to the rectangle position determining unit 15.

Using a calculating formula that has been set on the basis of the size of the reference circle set by the circle setting unit 12 and the size of each number display rectangle set by the rectangle setting unit 14, the rectangle position determining unit 15 determines the layout positions of the number display rectangles from the positions of the scale marks that have been set on the reference circle by the scale mark position determining unit 13.

The calculating formula that is used by the rectangle position determining unit 15 to determine the layout positions of the number display rectangles is set so that, in a case where a straight line that extends through the center of the reference circle on the display screen is a symmetrical axis, the number display rectangles for displaying the indication numbers indicating the values corresponding to scale marks disposed at positions symmetrical to each other are located at the same positions as viewed from the direction of the symmetrical axis, and these number display rectangles each have a layout position inscribed in the reference circle. In the first embodiment, the same positions as viewed from the direction of the symmetrical axis do not need to be exactly the same positions, but may be substantially the same positions. Further, each number display rectangle being inscribed in the reference circle does not necessarily means that each number display rectangle is located exactly at the same position, but may be substantially inscribed in the reference circle.

The calculating formula that is used by the rectangle position determining unit 15 to determine the layout positions of the number display rectangles is now described in detail.

The calculating formula is derived by inversely using a formula derived through procedures (A) to (D) described below. According to the calculating formula, the position of the center of a number display rectangle is calculated. The calculating formula is stored beforehand in a site to which the rectangle position determining unit 15 of the display control device 1 can refer.

In the description below, the lengths of the two sets of facing sides of each number display rectangle are represented by "TH" and "TW". Further, the radius of the reference circle is represented by "r".

Figure 2:
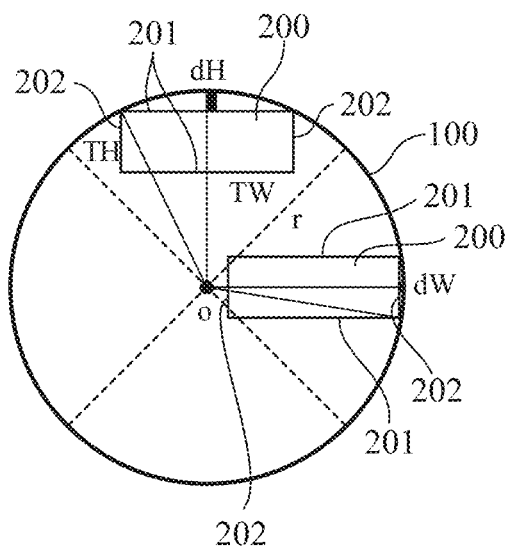
FIG. 2 is a diagram for explaining a method of deriving a mathematical formula to be used in the first embodiment, and is a diagram for explaining an image in which number display rectangles are disposed at positions horizontally and vertically inscribed in the reference circle, with the longitudinal direction of FIG. 2 being the vertical direction, the transverse direction of FIG. 2 being the horizontal direction.
Figure 2:
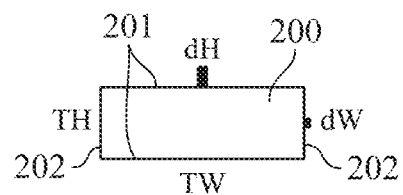

(A) The longitudinal direction of FIG. 2 is the vertical direction, the transverse direction of FIG. 2 is the horizontal direction, and the number display rectangles are disposed at positions inscribed in the reference circle in both the horizontal and vertical directions (see FIG. 2).

Here, the horizontal sides of each number display rectangle are first sides, the vertical sides are second sides, the length of each first side is represented by "TW" and the length of each second side is represented by "TH".

In FIG. 2, the number display rectangles are denoted by 200, the first sides are denoted by 201, the second sides are denoted by 202, and the reference circle is denoted by 100.

The difference (dH) between the radius r of the reference circle 100 and the length of a perpendicular line extending from the center o of the reference circle 100 to the circumference-side first side 201 of the number display rectangle 200 disposed at a position vertically inscribed in the reference circle 100 is then calculated. The difference (dW) between the radius r of the reference circle and the length of a perpendicular line extending from the center o of the reference circle 100 to the circumference-side second side 202 of the number display rectangle 200 disposed at a position horizontally inscribed in the reference circle 100 is also calculated.

Here, dH and dW are calculated according to the following Equations (1) and (2), respectively.

$$dH = r - \sqrt{(r*r) - (TW/2)*(TW/2)} \quad (1)$$

$$dW = r - \sqrt{(r*r) - (TH/2)*(TH/2)} \quad (2)$$

Figure 3:
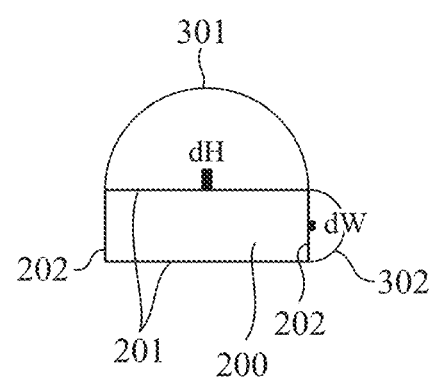
FIG. 3 is a diagram for explaining a method of deriving a mathematical formula to be used in the first embodiment, and is a diagram for explaining an image in which a semicircle having a diameter equal to the length TW of a first side of a number display rectangle is set on the first side of the number display rectangle, and a semicircle having a diameter equal to the length TH of a second side is set on the second side.

(B) Next, a semicircle having a diameter equal to the length TW of the first side 201 is set on the first side 201 of a number display rectangle 200, and a semicircle having a diameter equal to the length TH of the second side 202 is set on the second side 202 of a number display rectangle 200 (see FIG. 3).

The semicircle whose diameter is equal to the length TW of the first side 201 is a first semicircle (see 301 in FIG. 3), and the semicircle whose diameter is equal to the length TH of the second side 202 is a second semicircle (see 302 in FIG. 3).

Figure 4:
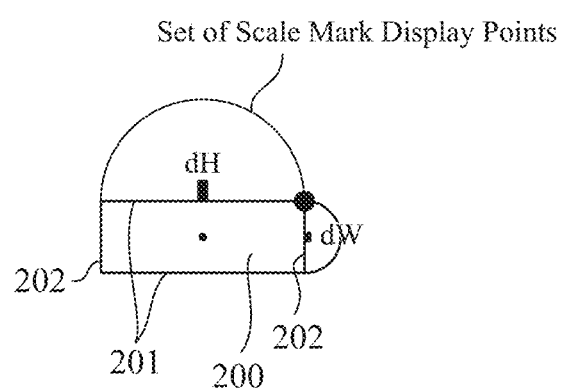
FIG. 4 is a diagram for explaining a method of deriving a mathematical formula to be used in the first embodiment, and is a diagram for explaining an image of a set of points (first scale mark display points) on the arc of a first semicircle, and a set of points (second scale mark display points) on the arc of a second semicircle.

A point on the arc of the first semicircle 301 and a point on the arc of the second semicircle 302 are a first scale mark display point and a second scale mark display point, respectively. That is, the arc of the first semicircle 301 is a set of first scale mark display points, and the arc of the second semicircle 302 is a set of second scale mark display points (see FIG. 4).

A scale mark display point is a point that is uniquely defined depending on the position of a numbered scale mark with inverse use of a formula derived through the procedure (D) described later, and is also a point that is set so that the layout position of the number display rectangle is determined by matching the position of the specified scale mark display point with the position of the numbered scale mark.

Figure 5:
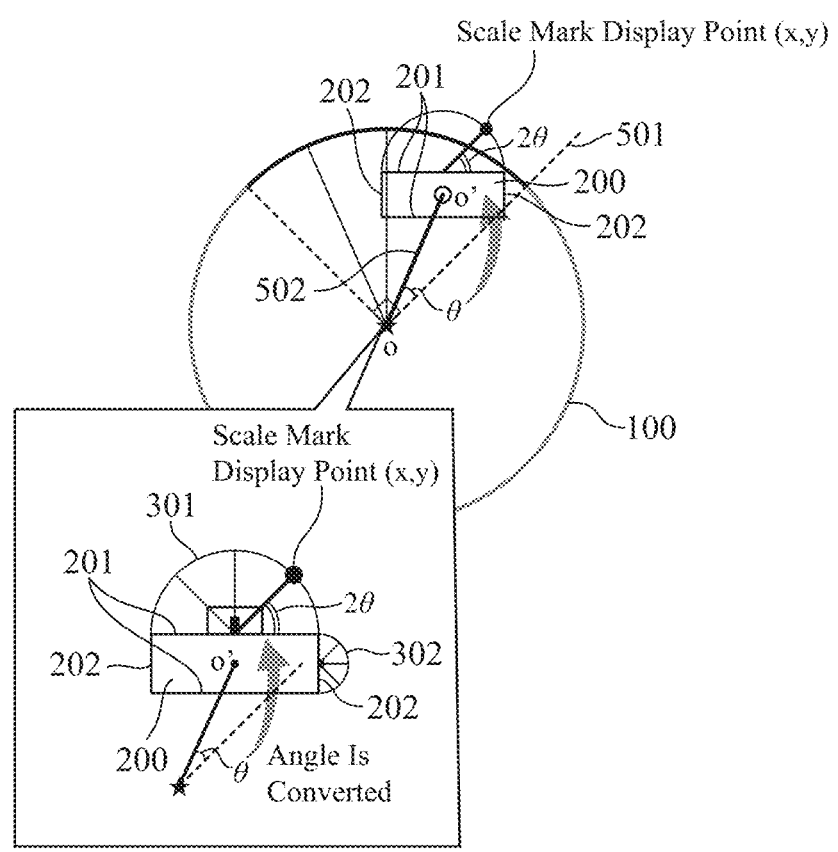
FIG. 5 is a diagram for explaining a method of deriving a mathematical formula to be used in the first embodiment, and is a diagram for explaining an image in which the coordinates of a scale mark display point on the first semicircle are expressed with the use of an angle θ of a 45-degree line extending through the center of the reference circle with respect to the line connecting the center of the reference circle to the center of a number display rectangle.

(C) As shown in FIG. 5, the reference circle 100 is divided by 45 degrees, the x-axis with the center o of the reference circle 100 as the origin is used as the reference in FIG. 5, and a 45-degree line (see 501 in FIG. 5) that forms an angle of 45 degrees with the x-axis and extends through the center o of the reference circle 100 is drawn. The coordinates of a scale mark display point on the first semicircle 301 is represented with the use of an angle θ of the 45-degree line 501 extending through the center o with respect to the line connecting the center o of the reference circle 100 to the center o' of the number display rectangle 200 (see 502 in FIG. 5).

Note that FIG. 5 shows an example image in a case where the process of expressing the coordinates of a scale mark display point on the first semicircle 301 is performed with the use of the angle θ. A similar process is also performed for any scale mark display point on the second semicircle 302.

In a case where the reference circle 100 is divided by 45 degrees, the coordinates of a scale mark display point on the first semicircle 301 are represented with the use of an angle 2θ.

Figure 6:
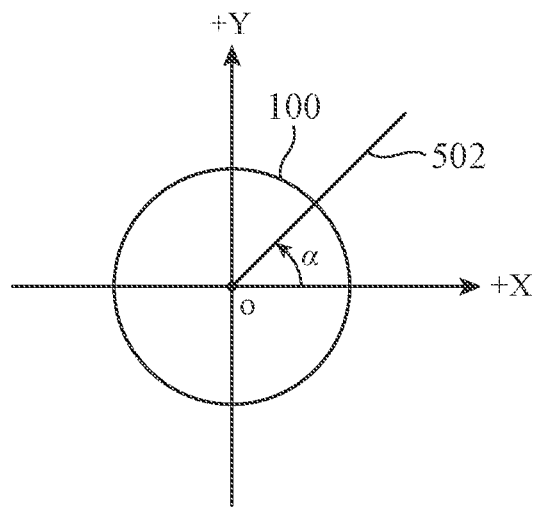
FIG. 6 is a diagram for explaining a method of deriving a mathematical formula to be used in the first embodiment, and is a diagram for explaining the reason why the angle 2θ between the first side and the radius of the first side, and the angle 2θ between the second side and the radius of the second side are used.

FIGS. 6 and 7 are diagrams for explaining the reason for using the angle 2θ described above. The reference circle 100 is not shown in FIG. 7.

As shown in FIG. 6, the X-axis and the Y-axis are set, with the center o of the reference circle 100 being the origin, for example. The angle formed by the X-axis and the straight line connecting the center o of the reference circle 100 to the center o' of the number display rectangle 200 is represented by α.

Figure 7A:
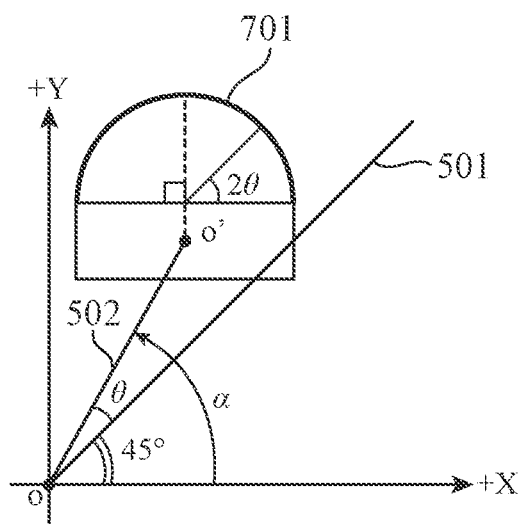
FIGS. 7A and 7B are diagrams for explaining a method of deriving a mathematical formula to be used in the first embodiment, and are other diagrams for explaining the reason why the angle 2θ between the first side and the radius of the first side, and the angle 2θ between the second side and the radius of the second side are used.

As shown in FIG. 7A, a straight line 501 having an angle of 45 degrees with the X-axis is drawn. Where 45 degrees≤α≤135 degrees, the angle θ formed by the straight line 501 and the straight line 502 connecting the center o of the reference circle 100 to the center o' of the number display rectangle 200 is expressed as 0 degrees≤θ≤90 degrees. In this case, the coordinates of scale mark display points on the first semicircle 301 are expressed with 2θ, so that the center o' of each number display rectangle 200 located at such a position that the angle α falls within the range expressed as 45 degrees≤α≤135 degrees, and a point within the range denoted by 701 in FIG. 7A on the arc of the first semicircle 301 can be put into a one-to-one correspondence.

Figure 7B:
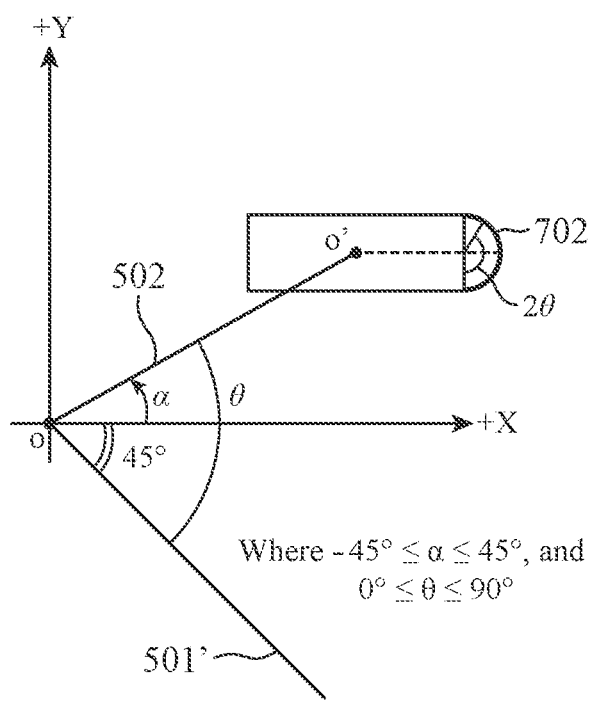

Meanwhile, as shown in FIG. 7B, a straight line 501' having an angle of −45 degrees with the X-axis is drawn. Where −45 degrees≤α≤45 degrees, the angle θ formed by the straight line 501' and the straight line 502 connecting the center o of the reference circle 100 to the center o' of the number display rectangle 200 is expressed as 0 degrees≤θ≤90 degrees. In this case, the coordinates of scale mark display points on the second semicircle 302 are expressed with 2θ, so that the center o' of each number display rectangle 200 located at such a position that the angle α falls within the range expressed as −45 degrees≤α≤45 degrees, and a point within the range denoted by 702 in FIG. 7B on the arc of the second semicircle 302 can be put into a one-to-one correspondence.

Although a case where the angle α is expressed as −45 degrees≤α≤135 degrees has been described with reference to FIGS. 6 and 7, the same concept applies in cases where the angle α is expressed as 135 degrees≤α≤180 degrees, −135 degrees≤α≤−180 degrees, or −45 degrees≤α≤−135 degrees, and therefore, explanation of those cases is not made herein.

Further, although the reference circle 100 is divided by 45 degrees in the first embodiment, the angle is merely an example. The same concept applies in a case where the reference circle 100 is divided by any appropriate angle, and the center o' of the number display rectangle 200 at any position and one point on a semicircle that is a set of scale mark display points can be put into a one-to-one correspondence.

The coordinates $(x_1, y_1)$ of a first scale mark display point with the center o' of the number display rectangle 200 as the point of origin are expressed by the following equations using the angle 2θ.

$$x_1=(TW/2)\times\cos 2\theta$$

$$y_1=(TW/2)\times\sin 2\theta+(TH/2)$$

Further, the coordinates $(x_2, y_2)$ of a second scale mark display point with the center o' as the point of origin are expressed by the following equations.

$$x_2=(TH/2)\times\sin 2\theta+(TW/2)$$

$$y_2=(TH/2)\times\cos 2\theta$$

Figure 8:
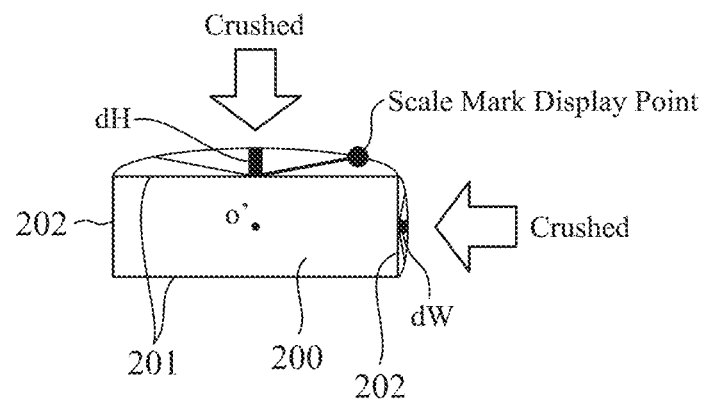
FIG. 8 is a diagram for explaining a method of deriving a mathematical formula to be used in the first embodiment, and is a diagram for explaining an image in which the first semicircle and the second semicircle are crushed so that the heights of the first semicircle and the second semicircle change to heights dH and dW, respectively.

(D) The first semicircle 301 and the second semicircle 302 are crushed so that the heights of the first semicircle 301 and the second semicircle 302 change to heights dH and dW, respectively (see FIG. 8).

As a result, the coordinates $(x_1', y_1')$ of a first scale mark display point after the first semicircle 301 is crushed are expressed by the following equations.

$$x_1'=(TW/2)\times\cos 2\theta$$

$$y_1'=\sin 2\theta\times dH+(TH/2)$$

Also, the coordinates $(x_2', y_2')$ of a second scale mark display point after the second semicircle 302 is crushed are expressed by the following equations.

$$x_2'=\sin 2\theta-dW+(TW/2)$$

$$y_2'=(TW/2)-\cos 2\theta$$

Figure 9:
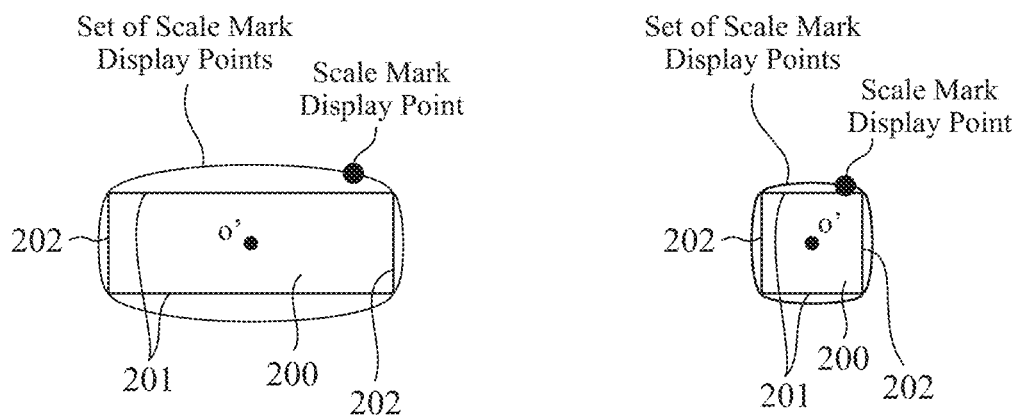
FIG. 9 is a diagram for explaining a method of deriving a mathematical formula to be used in the first embodiment, and is a diagram for explaining an image of the sets of first scale mark display points and second scale mark display points obtained after the first semicircles and the second semicircles are crushed.

(E) In a case where the same crushing as that described above in (D) is performed on the first semicircles 301 and the second semicircles 302 set on the four sides of a number display rectangle 200, the sets of the first scale mark display points and the second scale mark display points have the shapes shown in FIG. 9 after the first semicircles 301 and the second semicircles 302 set on the four sides are crushed.

Figure 10:
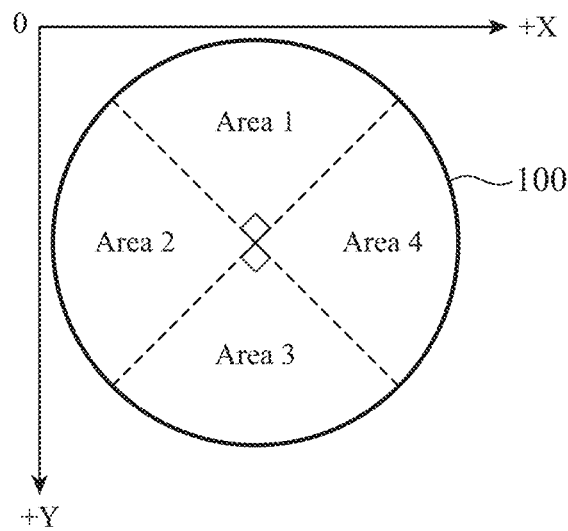
FIG. 10 is a diagram for explaining a method of deriving a mathematical formula to be used in the first embodiment, and is a diagram for explaining an example of areas obtained by dividing a reference circle into four equal parts.

(F) As the equations derived through the above procedure (D) are inversely used, a calculating formula for calculating the center of a number display rectangle 200 is derived for each area formed by dividing the reference circle 10 into four equal parts (see FIG. 10).

Here,

Angrate=180°/90°;

$$dH=r-\sqrt{(r*r)-(TW/2)*(TW/2)} \qquad (1)$$

$$dW=r-\sqrt{(r*r)-(TH/2)*(TH/2)} \qquad (2)$$

Angrate=180°/90° indicates that, in a case where θ varies within a range of 90 degrees as described in (C) above, a scale mark display point changes so that 2θ varies within a range of 180 degrees.

In a case where the position of a numbered scale mark is on the circumference of the reference circle 100 in area 1 or area 3, the calculating formula for calculating the coordinates $(x_3, y_3)$ of the center o' of the number display rectangle 200 having the position of the numbered scale mark as the point of origin is as shown below. In this case, the set of the scale mark display points to be used is a set of the first scale mark display points obtained after the first semicircle 301 is crushed.

$$x_3=G\times TW/2\times\cos(\text{Angrate}\times\theta_1)$$

$$y_3=F\times\sin(\text{Angrate}\times\theta_1)-dH+G\times TH/2$$

However, in a case where the position of the numbered scale mark is on the circumference of the reference circle 100 in area 1, F=+1, and G=+1.

In a case where the position of the numbered scale mark is on the circumference of the reference circle 100 in area 3, F=−1, and G=−1.

Further, the angle $\theta_1$ in the procedure (F) is defined as the angle (the numbered scale mark angle) between the straight line connecting the center o of the reference circle 100 to the position of the numbered scale mark, and the straight line that serves as the reference for the angle of each area. Here, the straight line that serves as the reference for the angle of area 1 is a straight line at an angle of 45° with respect to the straight line that extends through the center of the reference circle 100 in FIG. 10 and runs horizontally in the drawing (this straight line will be hereinafter referred to as the "horizontal straight line"). Likewise, the straight line serving as the reference for the angle of area 2 is the straight line at an angle of 135 with respect to the horizontal straight line, the straight line serving as the reference for the angle of area 3 is the straight line at an angle of −135° with respect to the horizontal straight line, and the straight line serving as the reference for the angle of area 4 is the straight line at an angle of 45° with respect to the horizontal straight line.

Figure 11:
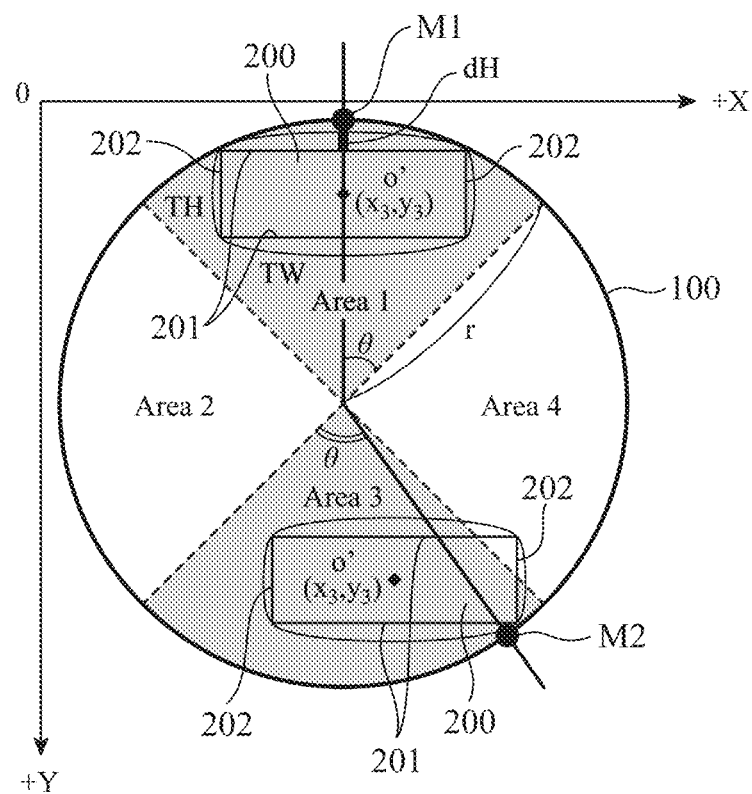
FIG. 11 is a diagram for explaining a method of deriving a mathematical formula to be used in the first embodiment, and is a diagram showing an example image of the coordinates of the center of a number display rectangle having the position of a numbered scale mark as the point of origin in a case where the numbered scale mark is on the circumference of the reference circle in area 1 or area 3 shown in FIG. 10.

FIG. 11 is a diagram showing an example image of the coordinates $(x_3, y_3)$ of the center o' of a number display rectangle 200 having the position of a numbered scale mark as the point of origin as obtained in a case where the position of the numbered scale mark is on the circumference of the reference circle 100 in area 1 or area 3 shown in FIG. 10.

In FIG. 11, the X-axis is in the horizontal direction, and the Y-axis is in the vertical direction in the drawing. As shown in FIG. 11, the rightward direction of the X-axis in the drawing is the positive direction, and the downward direction of the Y-axis in the drawing is the positive direction. Also, as shown in FIG. 11, the origin is located outside the reference circle 100.

Further, in the first embodiment, the straight line that extends through the center o of the reference circle 100 and runs parallel to the Y-axis is the "symmetrical axis" of the reference circle 100, with reference to FIG. 11, for example.

The numbered scale mark angle determined depending on the position of a numbered scale mark uniquely specifies the second scale mark display point corresponding to the numbered scale mark. As shown in FIG. 11, the numbered scale mark and the first scale mark display point (denoted by M1 and M2 in FIG. 11) are arranged so as to coincide with each other, and, as a result, the layout position of the number display rectangle 200 is also specified.

Meanwhile, in a case where the position of a numbered scale mark is on the circumference of the reference circle 100 in area 2 or area 4 shown in FIG. 10, the calculating formula for calculating the coordinates $(x_3, y_3)$ of the center o' of the number display rectangle 200 having the position of the numbered scale mark as the point of origin is as shown below. In this case, the set of the scale mark display points to be used is a set of the second scale mark display points obtained after the second semicircle 302 is crushed.

$$x_3=F\times\sin(\text{Angrate}\times\theta_1)\times dW+G\times TW/2$$

$$y_3=G\times TH/2\times\cos(\text{Angrate}\times\theta_1)$$

However, in a case where the position of the numbered scale mark is on the circumference of the reference circle 100 in area 2, F=+1, and G=+1.

In a case where the position of the numbered scale mark is on the circumference of the reference circle 100 in area 4, F=−1, and G=−1.

Figure 12:
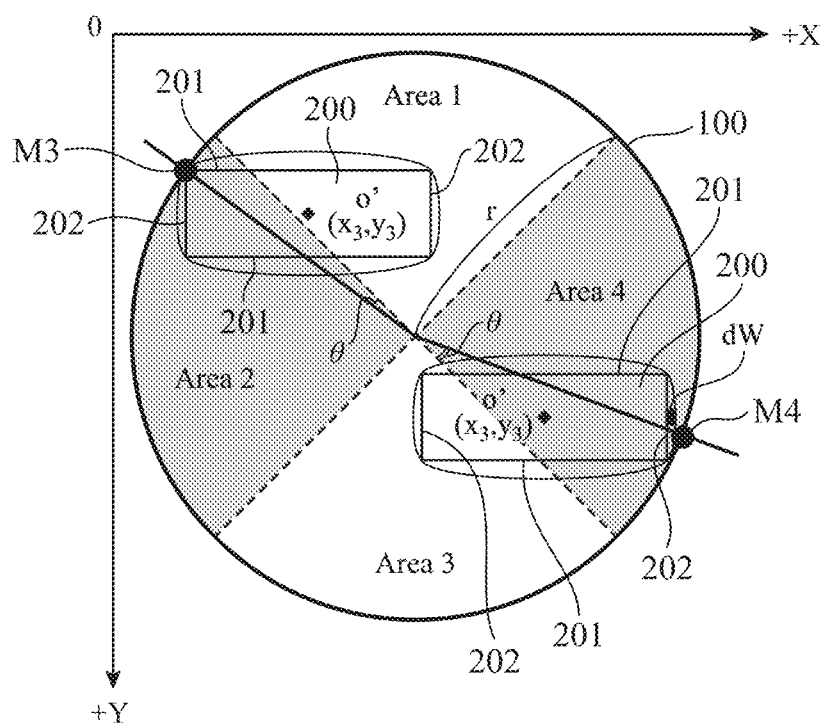
FIG. 12 is a diagram for explaining a method of deriving a mathematical formula to be used in the first embodiment, and is a diagram showing an example image of the coordinates of the center of a number display rectangle having the position of a numbered scale mark as the point of origin in a case where the numbered scale mark is on the circumference of the reference circle in area 2 or area 4 shown in FIG. 10.

FIG. 12 is a diagram showing an example image of the coordinates ($x_3$, $y_3$) of the center o' of a number display rectangle 200 having the position of a numbered scale mark as the point of origin as obtained in a case where the position of the numbered scale mark is on the circumference of the reference circle 100 in area 2 or area 4 shown in FIG. 10. In FIG. 12, the X-axis and the Y-axis are the same as those shown in FIG. 11.

The numbered scale mark angle determined depending on the position of a numbered scale mark uniquely specifies the second scale mark display point corresponding to the numbered scale mark. As shown in FIG. 12, the numbered scale mark and the second scale mark display point (denoted by M3 and M4 in FIG. 12) are arranged so as to coincide with each other, and, as a result, the layout position of the number display rectangle 200 is also specified.

That is, after the position of a numbered scale mark is determined, the scale mark display point is uniquely specified, and the position of the center o' of the number display rectangle 200 is also specified, according to the calculating formula derived in the above-described manner.

Figure 13:
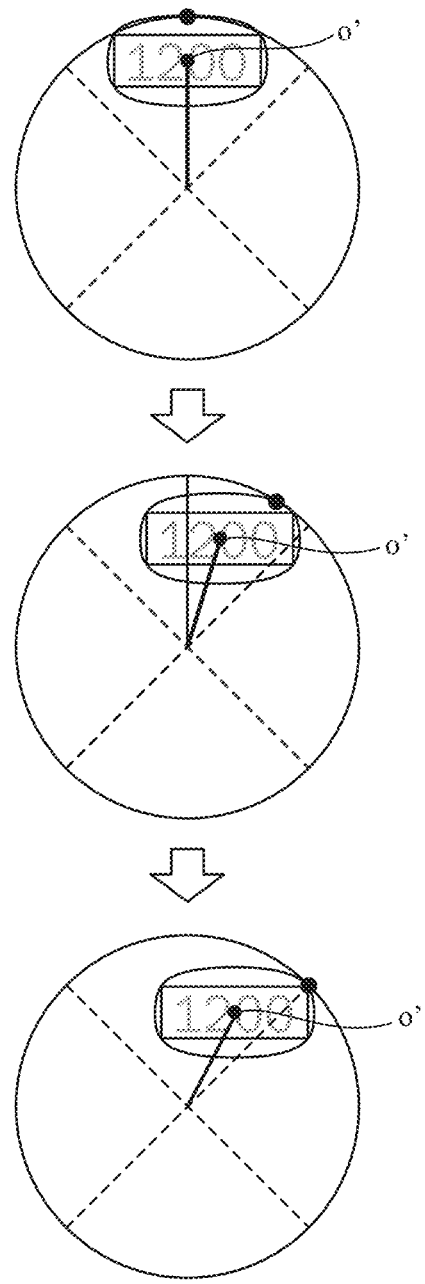
FIG. 13 is a diagram for explaining an image in which a new scale mark display point is specified depending on a change in the position of a numbered scale mark, and the coordinates of the center of the number display rectangle change with the newly specified scale mark display point in the first embodiment.

Further, when the position of the numbered scale mark changes, a new scale mark display point is specified according to the calculating formula derived as described above, and the coordinates of the center o' of the number display rectangle 200 also change with the newly specified scale mark display point (see FIG. 13).

Figure 14:
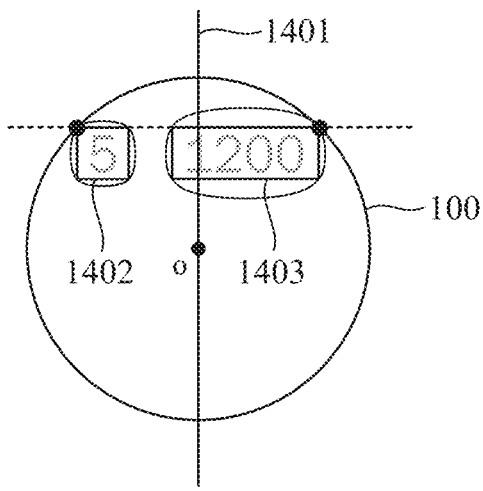
FIG. 14 is a diagram for explaining an image in which the numbers indicating the values corresponding to scale marks are at the same height, the image being displayed on the display device that displays a meter in the first embodiment.

According to the calculating formula, in a case where a straight line (see 1401 in FIG. 14) extending through the center o of the reference circle 100 is set as the symmetrical axis, the number display rectangles (denoted by 1402 and 1403 in FIG. 14) for displaying the indication numbers indicating the values corresponding to the scale marks disposed at positions symmetrical to each other are located at the same positions as viewed from the direction of the symmetrical axis 1401, and have layout positions inscribed in the reference circle 100, as shown in FIG. 14.

That is, in a display device that displays a meter, it is possible to display, on the display screen, the numbers indicating the values corresponding to the scale marks at the same height.

In the first embodiment, when the numbers indicating the values corresponding to scale marks are disposed at the same height, those numbers are not necessarily located at exactly the same height, but may be located at substantially the same heights.

Explanation now returns to FIG. 1.

Using the calculating formula derived from the size of the reference circle 100 and the size of a number display rectangle 200 in the above manner, the rectangle position determining unit 15 determines the layout position of the number display rectangle 200 from the position of a scale mark on the reference circle 100, the position having been determined by the scale mark position determining unit 13. Specifically, using the calculating formula shown in the above procedure (F), the rectangle position determining unit 15 determines the layout position of the number display rectangle 200 from the position of the scale mark on the reference circle 100, the position having been determined by the scale mark position determining unit 13.

The number display unit 16 displays a number in the number display rectangle 200 at the layout position determined by the rectangle position determining unit 15.

The present value acquiring unit 17 acquires the present value to be displayed by the pointer of the meter. For example, the present value acquiring unit 17 acquires the present value from a measurement device such as a velocity sensor that measures the value indicated by the meter. The present value acquiring unit 17 outputs the acquired present value to the pointer display unit 18.

The pointer display unit 18 displays a pointer indicating the position of a scale mark on the reference circle 100, the scale mark corresponding to the present value acquired by the present value acquiring unit 17.

Figure 15A:
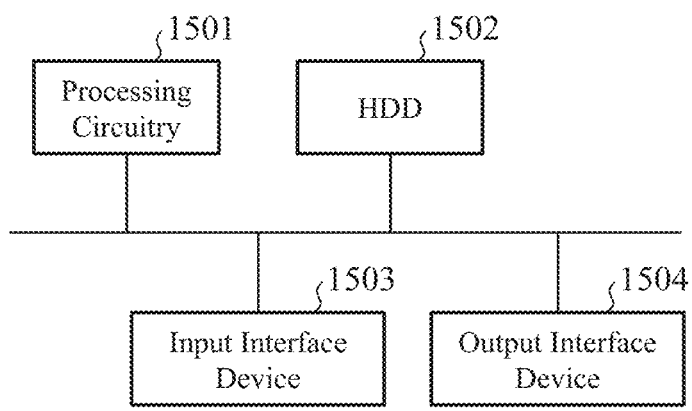
FIGS. 15A and 15B are diagrams each showing an example hardware configuration of the display control device according to the first embodiment.
Figure 15B:
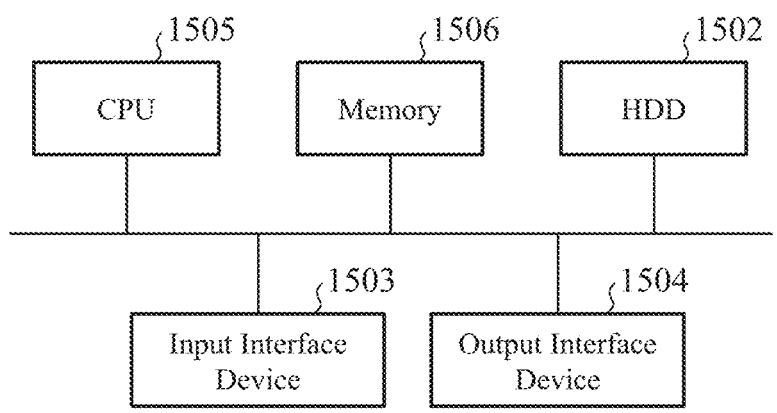

FIGS. 15A and 15B are diagrams each showing an example hardware configuration of the display control device 1 according to the first embodiment.

In the first embodiment, a processing circuit 1501 forms the reference information acquiring unit 11, the circle setting unit 12, the scale mark position determining unit 13, the rectangle setting unit 14, the rectangle position determining unit 15, the number display unit 16, the present value acquiring unit 17, and the pointer display unit 18. That is, the display control device 1 includes the processing circuit 1501 for performing control so that the indication numbers indicating the values corresponding to the scale marks on the reference circle 100 are displayed.

The processing circuit 1501 may be dedicated hardware as shown in FIG. 15A, or may be a central processing unit (CPU) 1505 that executes a program stored in a memory 1506 as shown in FIG. 15B.

Here, in a case where the processing circuit 1501 is dedicated hardware, the processing circuit 1501 may be single circuits, composite circuits, programmed processors, parallel-programmed processors, application specific integrated circuits (ASICs), field-programmable gate arrays (FPGAs), or a combination thereof.

In a case where the processing circuit 1501 is the CPU 1505, the functions of the reference information acquiring unit 11, the circle setting unit 12, the scale mark position determining unit 13, the rectangle setting unit 14, the rectangle position determining unit 15, the number display unit 16, the present value acquiring unit 17, and the pointer display unit 18 are provided by software, firmware, or a combination of software and firmware. That is, the reference information acquiring unit 11, the circle setting unit 12, the scale mark position determining unit 13, the rectangle setting unit 14, the rectangle position determining unit 15, and the number display unit 16 are provided by the CPU 1505 executing a program stored in a hard disk drive (HDD) 1502, the memory 1506, or the like, or a processing circuit such as a system large-scale integration (LSI). Further, the program stored in the HDD 1502, the memory 1506, or the like can be regarded as a program for causing a computer to carry out the procedures or methods of the reference information acquiring unit 11, the circle setting unit 12, the scale mark position determining unit 13, the rectangle setting unit 14, the rectangle position determining unit 15, the number display unit 16, the present value acquiring unit 17, and the pointer display unit 18. Here, the memory 1506 may be a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disk, a mini disk, a digital versatile disc (DVD), or the like, for example.

Note that some of the functions of the reference information acquiring unit 11, the circle setting unit 12, the scale mark position determining unit 13, the rectangle setting unit 14, the rectangle position determining unit 15, the number display unit 16, the present value acquiring unit 17, and the pointer display unit 18 may be provided by dedicated hardware, and the other functions may be provided by software or firmware. For example, the functions of the reference information acquiring unit 11 and the circle setting unit 12 can be provided by the processing circuit 1501 as dedicated hardware, and the functions of the scale mark position determining unit 13, the rectangle setting unit 14, the rectangle position determining unit 15, the number display unit 16, the present value acquiring unit 17, and the pointer display unit 18 can be provided by a processing circuit reading and executing a program stored in the memory 1506.

The display control device 1 also includes an input interface device 1503 and an output interface device 1504 that communicate with an input device being operated by the user or a device such as the display device 2.

Operations of the display control device 1 according to the first embodiment are now described.

First, regarding the display control device 1 according to the first embodiment, a basic operation for causing the display screen to display an indication number is described.

Figure 16:
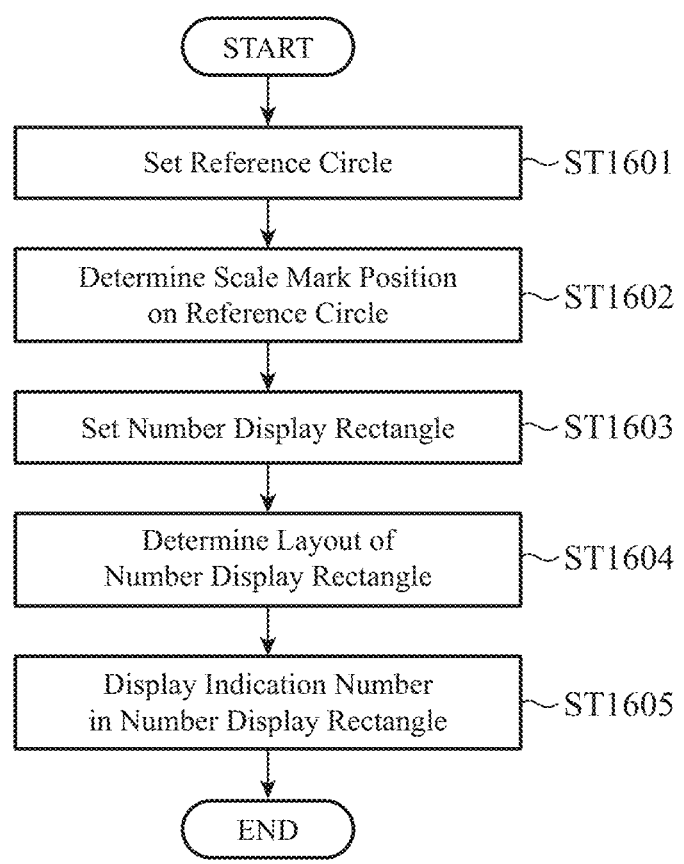
FIG. 16 is a flowchart for explaining a basic operation to be performed by the display control device so that an indication number is displayed in the first embodiment.

FIG. 16 is a flowchart for explaining a basic operation to be performed by the display control device 1 so that an indication number is displayed in the first embodiment.

The circle setting unit 12 sets a reference circle 100 that serves as the reference for the scale mark layout (step ST1601).

The scale mark position determining unit 13 determines the position of a scale mark on the reference circle 100 set by the circle setting unit 12 in step ST601 (step ST1602).

The scale mark position determining unit 13 outputs the determined scale mark position to the rectangle setting unit 14 and the rectangle position determining unit 15.

The rectangle setting unit 14 sets a number display rectangle 200 having the size corresponding to the number of the digits of the indication number (step ST1603).

The rectangle setting unit 14 outputs information about the set number display rectangle 200 to the rectangle position determining unit 15.

Using a calculating formula that has been set on the basis of the size of the reference circle 100 set by the circle setting unit 12 in step ST1601 and the size of the number display rectangle 200 set by the rectangle setting unit 14 in step ST1603, the rectangle position determining unit 15 determines the layout position of the number display rectangle 200 from the position of the scale mark that has been set on the reference circle 100 by the scale mark position determining unit 13 in step ST1602 (step ST1604).

The number display unit 16 displays a number in the number display rectangle 200 at the layout position determined by the rectangle position determining unit 15 in step ST1604 (step ST1605).

The basic operation of the display control device 1 for displaying an indication number is as described above with reference to the flowchart shown in FIG. 16.

However, a plurality of scale marks is normally assigned to a meter. On the other hand, the display control device 1 does not perform control to display indication numbers for all the values corresponding to the plurality of scale marks, because the display region is limited. The display control device 1 performs control so that an indication number is displayed for the value corresponding to a scale mark determined on the basis of the angle range in which scale marks are assigned to the meter, and the upper limit value and the lower limit value of the values to be measured by the meter.

In the description below, an operation to be performed by the display control device 1 so that the indication number indicating the value corresponding to a determined scale mark from among a plurality of scale marks is displayed is explained.

Figure 17:
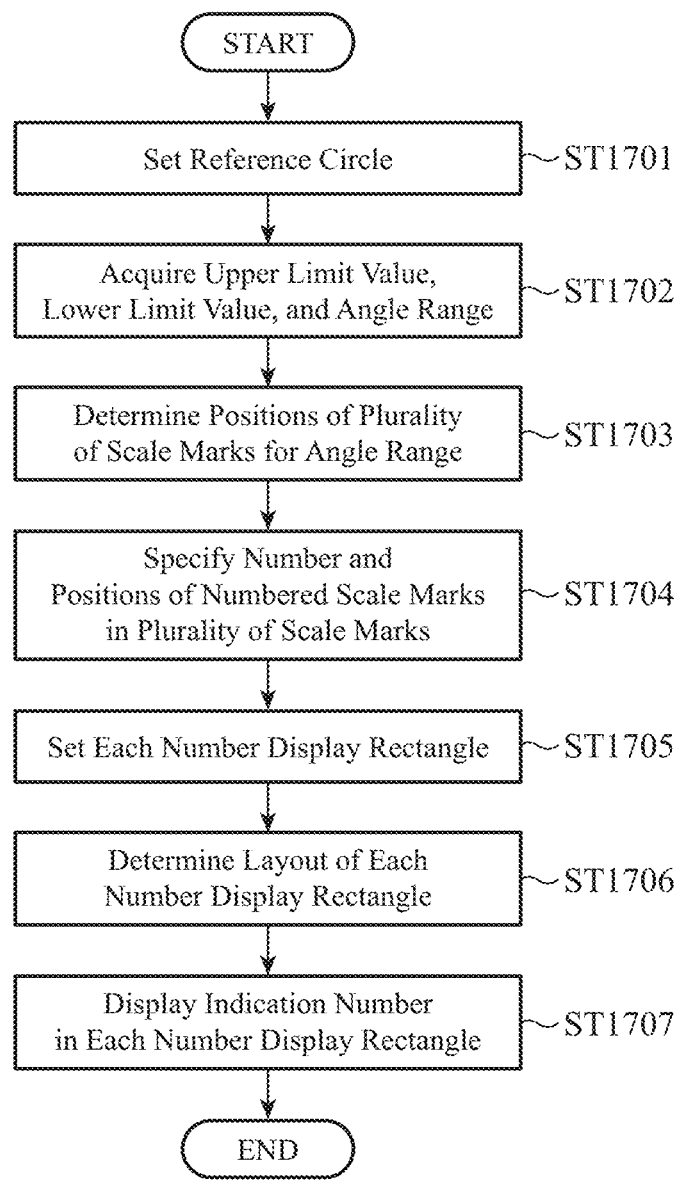
FIG. 17 is a flowchart for explaining an operation to be performed by the display control device of the first embodiment so that the scale mark at which an indication number is to be displayed is determined from among a plurality of scale marks, and the indication number is then displayed.

FIG. 17 is a flowchart for explaining an operation to be performed by the display control device 1 of the first embodiment so that the scale mark at which an indication number is to be displayed is determined from among a plurality of scale marks, and the indication number is then displayed.

The circle setting unit 12 sets a reference circle 100 that serves as the reference for the scale mark layout (step ST1701).

The reference information acquiring unit 11 acquires information that serves as the reference for the meter to be displayed under the control of the display control device 1 (step ST1702).

Specifically, the angle acquiring unit 111 acquires the angle range in which scale marks are assigned to the meter, the upper limit value acquiring unit 112 acquires the upper limit value of the values to be measured by the meter, and the lower limit value acquiring unit 113 acquires the lower limit value of the values to be measured by the meter.

The reference information acquiring unit 11 outputs the acquired angle range, upper limit value, and lower limit value to the scale mark position determining unit 13 and the rectangle setting unit 14.

The scale mark position determining unit 13 determines the positions of a plurality of scale marks for the angle range acquired by the angle acquiring unit 111 in step ST1702 (ST1703).

The scale mark position determining unit 13 outputs the determined scale mark positions to the rectangle setting unit 14 and the rectangle position determining unit 15.

On the basis of the upper and lower limit values and angle range acquired by the reference information acquiring unit 11 in step ST1702, the rectangle setting unit 14 determines the number of scale marks (numbered scale marks) on which indication numbers are to be displayed and the positions of the scale marks (step ST1704).

In a case where there is a plurality of numbered scale marks, the rectangle setting unit 14 sets a number display rectangle 200 for each scale mark (step ST1705).

The rectangle setting unit 14 outputs information about each set number display rectangle 200 to the rectangle position determining unit 15.

Using a calculating formula that has been set on the basis of the size of the reference circle 100 set by the circle setting unit 12 in step ST1701 and the size of the number display rectangle 200 set by the rectangle setting unit 14 in step ST1704, the rectangle position determining unit 15 determines the layout position of each number display rectangle 200 from the number of numbered scale marks and the position of the scale marks specified by the rectangle setting unit 14 in step ST1704 (step ST1706).

At each layout position determined by the rectangle position determining unit 15 in step ST706, the number display unit 16 displays the indication number corresponding to each numbered scale mark in each number display rectangle 200 (step ST1707).

Further, if there is a change in the positions of the scale marks after the indication numbers are displayed in step ST1707, the display control device 1 dynamically changes the positions of the scale marks and the display positions of the indication numbers depending on the change.

For example, the user operates an input device to input an instruction to change the angle range, and changes the angle range in which scale marks are assigned to the meter. Here, the upper limit value and the lower limit value do not change.

The angle acquiring unit 111 acquires the changed angle range, and outputs the changed angle range to the scale mark position determining unit 13.

In a case where a changed angle range is output, the scale mark position determining unit 13 determines the positions of a plurality of scale marks within the changed angle range (see step ST1703).

The processes in step ST1704 and the steps that follow are then repeated.

Although the user changes the angle range in which scale marks are assigned to the meter in the above example, this is merely an example. The display control device 1 is also capable of automatically changing the angle range.

As described above, the display control device 1 can dynamically change the angle range in which scale marks are assigned to the meter, determine the scale mark positions depending on the changed angle range, and dynamically change the number and the display positions of the indication numbers to be displayed.

Although not explained in the description of operations with reference to FIGS. 16 and 17 for ease of explanation, the present value acquiring unit 17 in the display control device 1 acquires the present value to be displayed with the pointer of the meter, and the pointer display unit 18 displays the pointer indicating the position of a scale mark on the reference circle 100, the scale mark corresponding to the present value. The pointer is only required to be displayed after the scale mark position determining unit 13 determines the scale mark position(s) (see step ST1602 in FIG. 16 and step ST1703 in FIG. 17).

Figure 18:
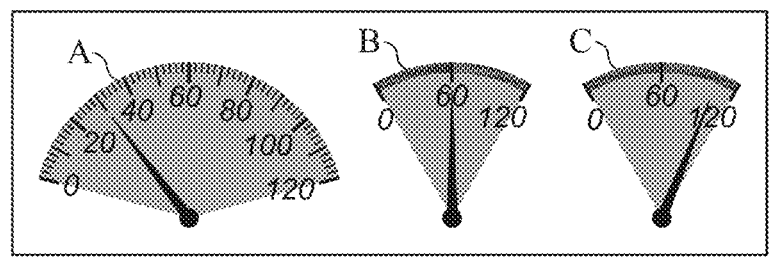
FIG. 18 is a diagram showing an example of an image of a display of meters that dynamically change with dynamic changes in the angle ranges in which scale marks are assigned to the meters, in a case where the dynamic changes are caused by the display control device in the first embodiment.
Figure 18:
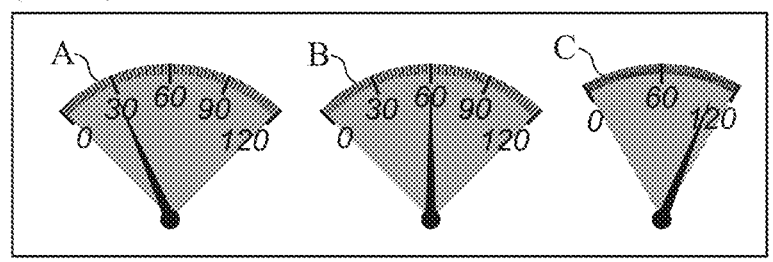
Figure 18:
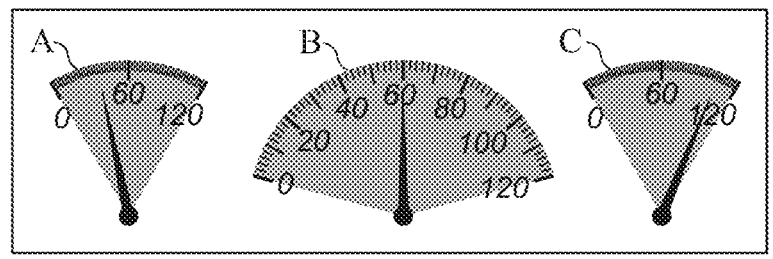

FIG. 18 is a diagram showing an example of an image of a display of meters that dynamically change with dynamic changes in the angle ranges in which scale marks are assigned to the meters, in a case where the dynamic changes are caused by the display control device 1 of the first embodiment.

In FIG. 18, the display control device 1 causes a display screen to display three meters that are meters A to C.

For example, the display control device 1 changes the meter A from a state with an angle range to a state with a narrower angle range as shown in FIG. 18, and changes the meter B from a state with an angle range to a state with a wider angle range as shown in FIG. 18.

In this case, the meters A to C displayed on the display screen change from (state 1) to (state 2) and to (state 3).

As shown in FIG. 18, the display control device 1 determines the positions of scale marks to be assigned to the meters, depending on the changes in the angle ranges of the meters. In either a case where the angle range of each of the meters A to C is narrowed, or a case where the angle range of each of the meters A to C is widened, the display control device 1 always causes the display screen to display indication numbers at substantially the same heights as viewed from the symmetrical axis extending through the center of the reference circle on the display screen.

The display control device 1 according to the first embodiment dynamically and smoothly changes the display of a meter, depending on the angle range of the meter. As a result, even in a case where a plurality of meters is displayed on the display screen as shown in FIG. 18, for example, the meters can be displayed in a limited display area on the display screen in such a manner as to achieve both viewability of the meters and detailed display of a specific one of the meters.

Although display of meters changes with changes in the angle range in the example shown in FIG. 18, this is merely an example. Even in a case where the upper limit value or the lower limit value is changed, the display control device 1 redetermines the number of scale marks and the positions of the scale marks with the change, and then causes the display screen to display the number and the positions of the scale marks. After that, the number of indication numbers and the display positions of the indication numbers can be dynamically changed depending on the redetermined number and positions of the scale marks.

As described above, according to the first embodiment, the display control device 1 includes: the circle setting unit 12 that sets a reference circle 100 that serves as the reference for a scale mark layout; the scale mark position determining unit 13 that determines the position of a scale mark on the reference circle 100; the rectangle setting unit 14 that sets a number display rectangle 200 of the size corresponding to the number of digits of the indication number indicating the value corresponding to the scale mark; the rectangle position determining unit 15 that determines the layout position of the number display rectangle 200 from the position of the scale mark, using a calculating formula that has been set on the basis of the size of the reference circle 100 and the size of the number display rectangle 200; and the number display unit 16 that displays a number in the number display rectangle 200. Here, the calculating formula is designed so that, in a case where a straight line extending through the center of the reference circle 100 on a display screen is set as a symmetrical axis, number display rectangles 200 for displaying indication numbers indicating the values corresponding to scale marks disposed at positions symmetrical to each other are located at the same position as viewed from the direction of the symmetrical axis, and each number display rectangle 200 is located at a layout position inscribed in the reference circle 100. Accordingly, in a case where the symmetrical axis extends in a vertical direction on the display screen when viewed from the user, for example, it is possible to align the heights of the indication numbers corresponding to scale marks located at positions symmetrical to each other. Further, the indication numbers are arranged at positions substantially inscribed in the reference circle. As a result, the numbers indicating the values corresponding to scale marks can be displayed in a well-balanced manner on a display device that displays a circular meter.

Further, in the display control device 1, the scale mark position determining unit 13 determines the positions of a plurality of scale marks with respect to an angle range in which scale marks are assigned to the circular meter, and the rectangle setting unit 14 specifies, of the plurality of scale marks, the number of scale marks at which indication numbers are to be displayed, and the positions of the scale marks, on the basis of the upper and lower limit values of the values to be measured by the circular meter, and the angle range. Accordingly, the display area of the meter can be smoothly changed, and the layout positions of the number display rectangles 200 for displaying the indication numbers can be dynamically changed with the change in the display area. As a result, in a case where a plurality of meters is displayed on the display screen, for example, the meters can be displayed in a limited display area on the display screen in such a manner as to achieve both viewability of the meters and detailed display of a specific one of the meters.

Second Embodiment

As described above in the first embodiment, the display control device 1 can dynamically change the angle range between the lower limit value and the upper limit value of the target values of a meter in accordance with an instruction from the user, for example, and can also dynamically change the number of the scale marks of the meter, the scale mark positions, the number of indication numbers, and the layout positions of the indication numbers.

In a second embodiment described below, the display control device 1 dynamically changes part of the angle range between the lower limit value and the upper limit value of the target values of a meter, and, depending on the change, re-sets the number of the scale marks of the meter, the scale mark positions, the number of indication numbers, and the layout positions of the indication numbers.

Figure 19:
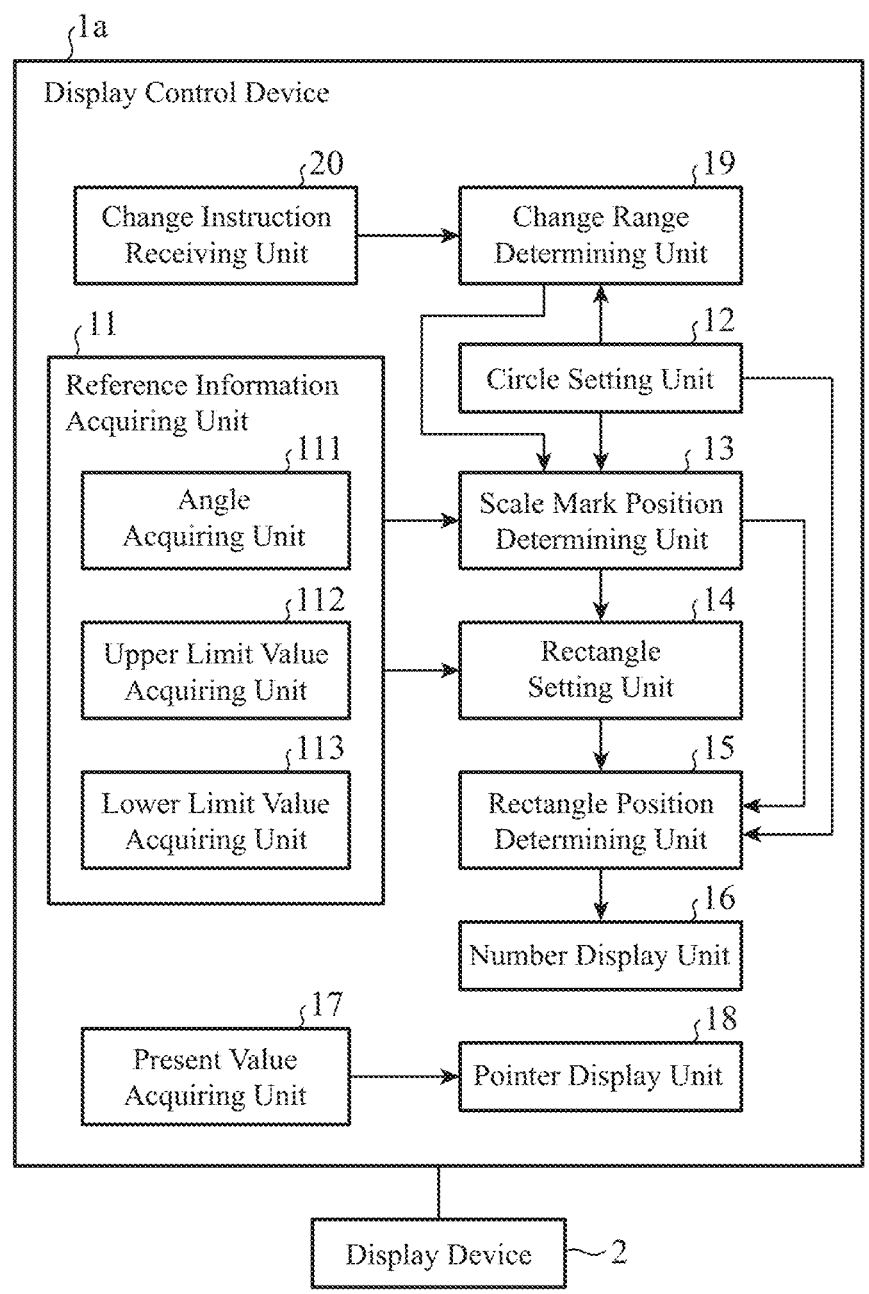
FIG. 19 is a diagram showing an example configuration of a display control device according to a second embodiment.

FIG. 19 is a diagram showing an example configuration of a display control device 1*a* according to the second embodiment.

In FIG. 19, the same components as those of the display control device 1 described with reference to FIG. 1 in the first embodiment are denoted by the same reference numerals as those used in FIG. 1, and explanation thereof is not repeated herein.

The display control device 1*a* differs from the display control device 1 according to the first embodiment in including a change range determining unit 19 and a change instruction receiving unit 20.

The change range determining unit 19 determines a change angle range in which the intervals at which a plurality of scale marks is assigned to a meter in the angle range in which the scale marks are assigned to the meter, while the meter is displayed on a display screen.

Specifically, the change range determining unit 19 sets a prescribed one of the scale marks on a reference circle 100 as the reference scale mark, and determines a change angle range so that the reference straight line connecting the reference scale mark to the center o of the reference circle 100 divides the center angle of the change angle range into equal parts.

The change range determining unit 19 may automatically determine the change angle range, or may determine the change angle range in accordance with an instruction from the user or the like. This aspect ill be described later in detail in the description of operations of the display control device 1*a*. In a case where the change range determining unit 19 automatically determines the change angle range, the change angle range to be determined by the change range determining unit 19 is set in advance. In this case, the change angle range is set so that the absolute value of the angle of one part obtained by dividing the change angle range with the reference straight line does not exceed the value obtained by dividing the angle range of the meter by two. The user or the like sets the change angle range by designating beforehand the angle of one part to be obtained by dividing the change angle range with the reference straight line.

The change range determining unit 19 outputs information about the determined change angle range to the scale mark position determining unit 13.

In the change angle range, which values are to be the upper limit value and the lower limit value that can be assigned in the change angle range are determined on the basis of the preset change angle range, the angle of one part obtained by dividing the change angle range with the reference straight line, and the reference scale mark.

Here, as an example, the change range determining unit 19 adds 10 to the value corresponding to the reference scale mark and sets the resultant value as the upper limit value that can be assigned in the change angle range, while subtracting 10 from the value corresponding to the reference scale mark and setting the resultant value as the lower limit value that can be assigned in the change angle range.

Note that the change angle range is not necessarily set in advance as a fixed range. For example, the condition that "the change angle range is ±% of the angle range of the meter currently displayed on the display screen" may be set in advance, and the change range determining unit 19 may determine the change angle range depending on the angle range of the meter currently displayed on the display screen, under the condition that has been set in advance.

In the second embodiment, in the change angle range, the scale mark position determining unit 13 determines the positions of a plurality of scale marks on the reference circle 100 with respect to the change angle range.

The scale mark position determining unit 13 may determine the positions of a plurality of scale marks on the reference circle 100 with respect to the change angle range by the same method as the scale mark position determining method described in the first embodiment. Specifically, the scale mark position determining unit 13 divides the change angle range so that the scale marks are equally spaced with the number of the scale marks corresponding to the values from the lower limit value to the upper limit value of the change angle range, and then determines the positions of the scale marks in the change angle range.

The rectangle setting unit 14 then sets number display rectangles 200 in the change angle range.

For which values indication numbers are to be displayed in the change angle range are determined depending on the upper and lower limit values of the values to be displayed in the change angle range, and the change angle range. The rectangle setting unit 14 may set the number display rectangle within the change angle range by the same method as the number display rectangle setting method described in the first embodiment.

Specifically, the rectangle setting unit 14 specifies the number of numbered scale marks and the positions of the scale marks, on the basis of the upper and lower limit values of the change angle range and the change angle range.

In a case where there is a plurality of numbered scale marks, the rectangle setting unit 14 sets a number display rectangle for each scale mark.

Further, in a case where the scale mark position determining unit 13 has changed the positions of the scale marks in the change angle range, the rectangle setting unit 14 determines the number of numbered scale marks and the positions of the scale marks in the change angle range, depending on the positions of the scale marks after the scale mark position determining unit 13 has made the change.

The rectangle setting unit 14 outputs information about the set number display rectangle to the rectangle position determining unit 15.

Using the calculating formula described in the first embodiment in the change angle range, the rectangle position determining unit 15 determines the layout positions of the number display rectangle from the positions of the scale marks on the reference circle 100 in the change angle range, the positions having been determined by the scale mark position determining unit 13.

The number display unit 16 displays numbers in the number display rectangles at the layout positions determined in the change angle range by the rectangle position determining unit 15.

For the angle range outside the change angle range, the display control device 1a redetermines the scale mark positions of the scale marks in the angle range and the layout positions of the number display rectangles. The display control device 1a then performs control so that indication numbers are displayed at the redetermined layout positions of the number display rectangles.

This aspect is described below in detail.

The scale mark position determining unit 13 redetermines scale mark positions, for the scale marks outside the change angle range among the plurality of scale marks on the reference circle 100. Specifically, as for the scale marks corresponding to values equal to or smaller than the lower limit value of the change angle range, the scale mark position determining unit 13 divides the angle range so that the scale marks are equally spaced with the number of the scale marks corresponding to the values from the lower limit value of the change angle range to the lower limit value of the angle range of the meter, and redetermines the positions of the scale marks. Further, as for the scale marks corresponding to values equal to or greater than the upper limit value of the change angle range, the scale mark position determining unit 13 divides the angle range so that the scale marks are equally spaced with the number of the scale marks corresponding to the values from the upper limit value of the change angle range to the upper limit value of the angle range of the meter, and redetermines the positions of the scale marks.

Using the calculating formula in the angle range outside the change angle range, the rectangle position determining unit 15 redetermines the layout positions of the number display rectangles from the positions of the scale marks on the reference circle 100 outside the change angle range, the positions having been redetermined by the scale mark position determining unit 13.

The change instruction receiving unit 20 receives information about an enlargement instruction point that will be described later. Specifically, the user or the like operates an input device such as a mouse, to input an enlargement instruction point, for example. In a case where the input device is a touch panel, for example, the user or the like inputs an enlargement instruction point by touching the display screen. The change instruction receiving unit 20 receives information regarding the enlargement instruction point input by the user or the like. The change instruction receiving unit 20 outputs the received information about the enlargement instruction point to the change range determining unit 19.

The hardware configuration of the display control device 1a according to the second embodiment is the same as the hardware configuration of the display control device 1 described in the first embodiment with reference to FIGS. 15A and 15B, and therefore, explanation thereof is not repeated herein.

The change range determining unit 19 and the change instruction receiving unit 20 are provided by the processing circuit 1501, like the reference information acquiring unit 11, the circle setting unit 12, the scale mark position determining unit 13, the rectangle setting unit 14, the rectangle position determining unit 15, and the number display unit 16.

Operations of the display control device 1a according to the second embodiment are now described.

Figure 20:
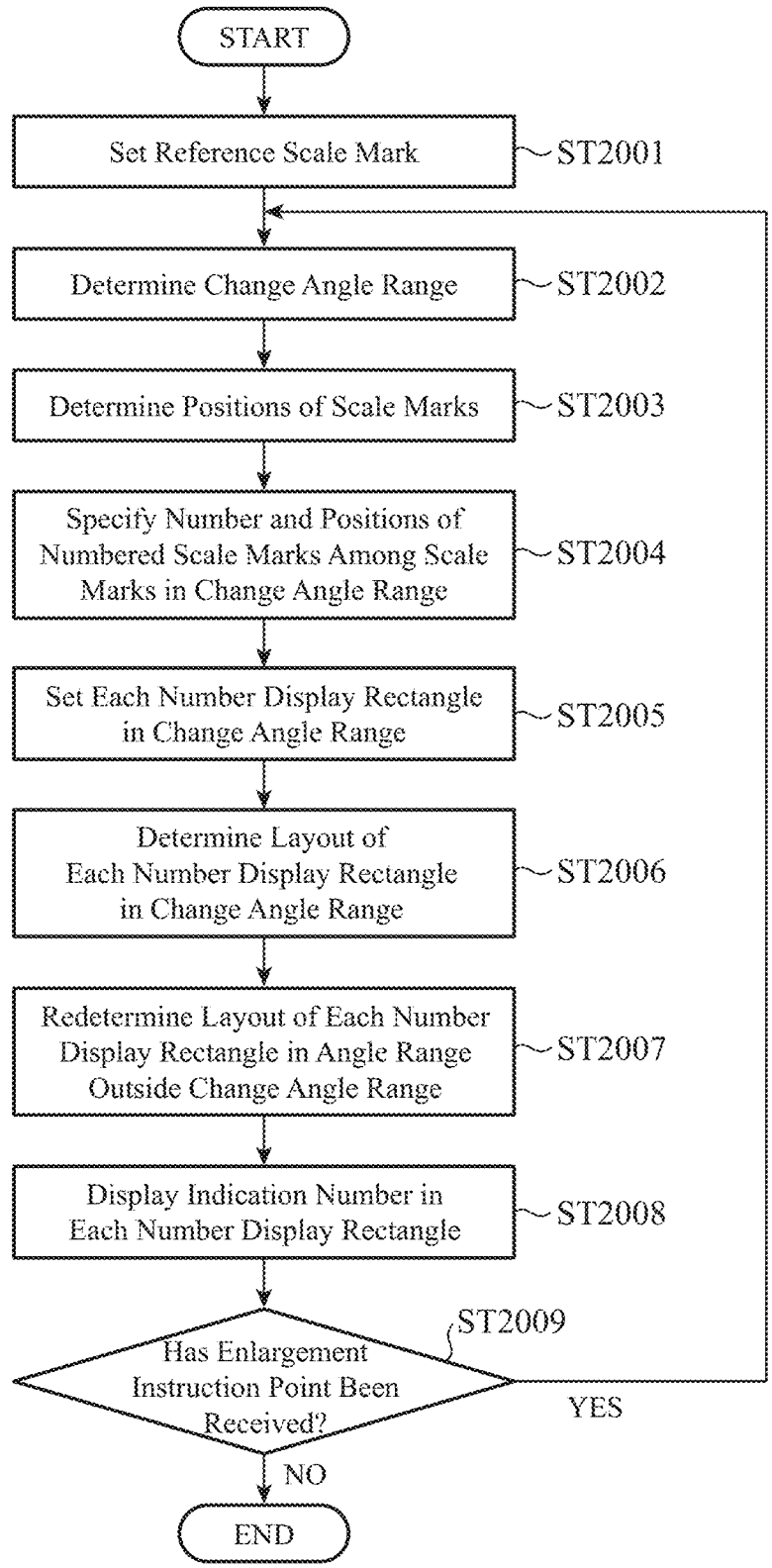
FIG. 20 is a flowchart for explaining an operation of the display control device according to the second embodiment.

FIG. 20 is a flowchart for explaining an operation of the display control device 1a according to the second embodiment.

Figure 21:
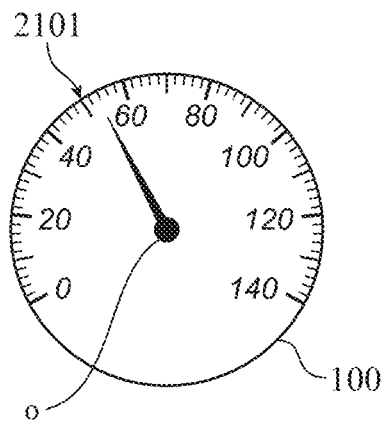
FIG. 21 is a diagram showing an example image of a meter displayed on a display device in the second embodiment.

In this example, before the start of the operation described with reference to the flowchart in FIG. 20, the operation described with reference to FIG. 17 in the first embodiment is performed, and a meter is displayed on the display device 2 as shown in FIG. 21, for example. The operation shown in the flowchart in FIG. 17 has already been described in the first embodiment, and therefore, explanation thereof is not repeated herein.

The change range determining unit 19 sets one of the scale marks on the reference circle 100 as the reference scale mark (step ST2001).

The change range determining unit 19 can set any scale mark as the reference scale mark.

Here, the change range determining unit 19 sets the scale mark (see 2101 in FIG. 21) corresponding to "50" on the meter as the reference scale mark among the plurality of scale marks on the reference circle 100. Accordingly, the upper limit value that can be assigned in the change angle range is "60", the lower limit value is "40", and "40 to 60" corresponding to the scale marks on the meter are the values of the scale marks within the change angle range.

The change range determining unit 19 determines the change angle range so that the reference straight line connecting the reference scale mark set in step ST2001 to the center o of the reference circle 100 serves as the line that divides the center angle of the change angle range into equal parts (step ST2002).

The change range determining unit 19 outputs information about the determined change angle range to the scale mark position determining unit 13.

The scale mark position determining unit 13 determines the positions of a plurality of scale marks for the angle range (step ST2003).

Specifically, the scale mark position determining unit 13 determines the positions of a plurality of scale marks for the change angle range determined by the change range determining unit 19 in step ST2002.

The scale mark position determining unit 13 also redetermines scale mark positions, for the scale marks outside the change angle range among the plurality of scale marks on the reference circle 100.

The scale mark position determining unit 13 outputs the determined scale mark positions to the rectangle setting unit 14 and the rectangle position determining unit 15.

The rectangle setting unit 14 specifies the number of numbered scale marks and the positions of the scale marks in the change angle range, on the basis of the upper and lower limit values of the change angle range and the change angle range (step ST2004).

In a case where there is a plurality of numbered scale marks, the rectangle setting unit 14 sets a number display rectangle for each scale mark (step ST2005).

The rectangle setting unit 14 outputs information about the set number display rectangle to the rectangle position determining unit 15.

Using the calculating formula in the change angle range, the rectangle position determining unit 15 determines the layout positions of the second number display rectangles from the positions of the scale marks on the reference circle within the change angle range, the positions having been determined by the scale mark position determining unit 13 (step ST2006).

Using the calculating formula in the angle range outside the change angle range, the rectangle position determining unit 15 redetermines the layout positions of the first number display rectangles from the positions of the scale marks on the reference circle outside the change angle range, the positions having been redetermined by the scale mark position determining unit 13 in step ST2003 (step ST2007).

The number display unit 16 displays indication numbers in first number display rectangles and second number display rectangles at the layout positions of the second number display rectangles determined by the rectangle position determining unit 15 in step ST2006, and the layout positions of the first number display rectangles redetermined by the rectangle position determining unit 15 in step ST2007 (step ST2008).

Figure 22:
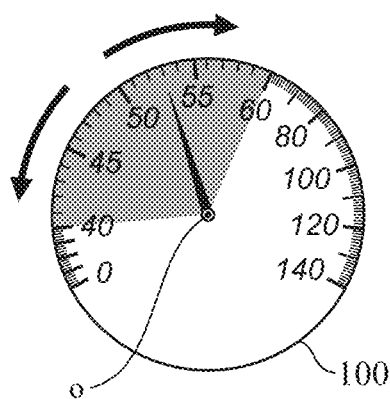
FIG. 22 is a diagram showing an example image in which part of the angle range of the meter displayed as shown in FIG. 21 is widened and displayed in the second embodiment.

As a result, the display of the meter shown in FIG. 21 is changed to the display shown in FIG. 22.

As shown in FIG. 22, on the meter, the scale mark intervals in the range of "40 to 60" have been widened, and accordingly, "45" and "55" are newly displayed as indication numbers.

Further, the scale marks in the ranges of "0 to 40" and "60 to 140" on the meter are displayed at narrowed intervals, because the scale marks in the range of "40 to 60" have been widened. Accordingly, the positions of the indication numbers "0", "40", "60", "80", "100", "120", "140" have also been changed.

In this manner, the display control device 1a can set part of the angle range as the change angle range, and change the intervals between the scale marks and the layout positions of the indication numbers in the change angle range. In conjunction with this, the display control device 1a can also redetermine the scale mark positions and the layout positions of the indication numbers in the angle range other than the change angle range.

The user or the like can make a change to the change angle range from the state where the meter is displayed as shown in FIG. 22. However, the change angle range that can be changed by the user or the like is such a range that the absolute value of the angle of one part obtained by dividing the changed change angle range with the reference straight line does not exceed the value obtained by dividing the angle range of the meter by two.

In the description below, the operation of the display control device 1a in an example in which the user or the like further widens the change angle range is described in detail.

Figure 23:
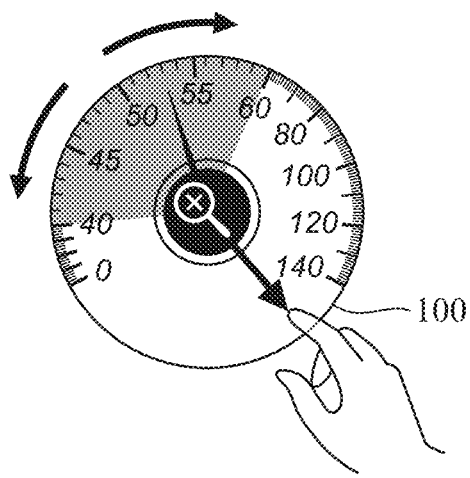
FIG. 23 is a diagram for explaining an example image of an operation in which a user or the like issues an instruction to change a change angle range in the second embodiment.

The user or the like slides the touching finger to the opposite side from the reference scale mark ("50" in this example), as viewed from the center of the meter (or the center of the reference circle 100), for example (see FIG. 23).

The change instruction receiving unit 20 receives the touch point after the slide as an enlargement instruction point, and outputs information about the enlargement instruction point to the change range determining unit 19 (in the case of "YES" in step ST2009). The operation then returns to step ST2002.

Returning to step ST2002, the change range determining unit 19 sets the center angle depending on the distance between the enlargement instruction point and the center o of the reference circle 100, and determines the change angle range. Note that the relationship between the distance from the enlargement instruction point to the center o of the reference circle 100 and the size of the center angle to be set is determined in advance.

Here, the change range determining unit 19 widens the center angle by the amount corresponding to the distance from the enlargement instruction point to the center o of the reference circle 100, to widen the change angle range.

After that, the processes in step ST2003 and the steps that follow are repeated. As a result, the change angle range is widened, and the intervals between the scale marks, the scale mark positions, the indication numbers, and the display positions of the indication numbers on the meter change with the widened change angle range.

Although the user or the like inputs an instruction to widen the change angle range, and the display control device 1a widens the change angle range accordingly has been described in this example, the display control device 1a can narrow the change angle range. For example, after the user or the like widens the change angle range by sliding the touching finger to the opposite side from the reference scale mark as viewed from the center of the reference circle 100, the user or the like may slide the touching finger toward the center of the reference circle 100. In this case, the distance between the enlargement instruction point and the center o of the reference circle 100 becomes shorter, and the change angle range that changes with the distance becomes narrower.

Figure 24:
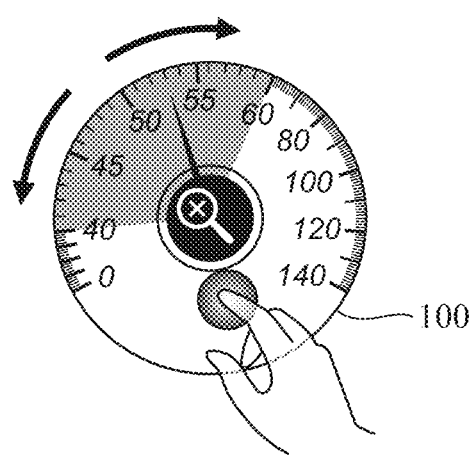
FIG. 24 is a diagram for explaining another example image of an operation in which a user or the like issues an instruction to change a change angle range in the second embodiment.

Further, in the above description, the user or the like slides the touching finger, for example, to input an enlargement instruction point. The user or the like does not necessarily do so, but can input an enlargement instruction point by long-pressing the display screen at one point with a finger (see FIG. 24).

The change instruction receiving unit 20 detects that the enlargement instruction point is pressed, and receives the continuous time during which the enlargement instruction point is pressed. The change instruction receiving unit 20 outputs information about the received continuous time as information regarding the enlargement instruction point, to the change range determining unit 19 (in the case of "YES" in step ST2009). The operation then returns to step ST2002.

Returning to step ST2002, the change range determining unit 19 sets the center angle depending on the continuous time during which the enlargement instruction point was pressed, and determines the change angle range. Note that the relationship between the continuous time during which the enlargement instruction point was pressed and the size of the center angle to be set is determined in advance.

The user or the like can also narrow the widened change angle range by removing the long-pressing finger from the display screen.

For example, when the user or the like removes the long-pressing finger from the display screen, the display control device 1a returns the change angle range to the state that was observed before the enlargement based on the instruction from the user or the like. Further, the display control device 1a may put the change angle range into a 0-degree state, for example.

Although steps ST2004 to ST2007 are carried out in this order in FIG. 20, the processing order is not limited to this, and the process in step ST2007 may be carried out before the processes in steps ST2004 to ST2006.

Further, in the operation of the display control device 1a in the above description, the user or the like further widens or narrows the change angle range after setting the change angle range.

However, the display control device 1a does not necessarily operate in this manner, but can issue an instruction to set a change angle range on a meter in a display state in which any change angle range has not been set as shown in FIG. 21. The user or the like can issue an instruction to set such a change angle range that the absolute value of the angle of one part obtained by dividing the change angle range with the reference straight line does not exceed the value obtained by dividing the angle range of the meter by two.

In this case, the user or the like first inputs an enlargement instruction point, and the change instruction receiving unit 20 receives the enlargement instruction point, for example. The change instruction receiving unit 20 then outputs information about the received enlargement instruction point to the change range determining unit 19.

The change range determining unit 19 sets the reference scale mark that is a scale mark on the straight line extending through the enlargement instruction point and the center o of the reference circle 100, and is a scale mark located on the opposite side of the center o from the enlargement instruction point (see step ST2001). The processes after that are the same as those in the above-described operation in step ST2002 and the steps that follow, and therefore, explanation thereof is not repeated herein.

In this manner, the display control device 1a can set a change angle range automatically or on the basis of an instruction from the user or the like, and dynamically change the change angle range.

Further, in the second embodiment, the display control device 1a can dynamically change the angle range in which scale marks are assigned to a meter, determine the scale mark positions depending on the changed angle range, and dynamically change the number and the display positions of the indication numbers to be displayed, as in the first embodiment (see FIG. 18).

As described above, according to the second embodiment, when the symmetrical axis extends in a vertical direction on the display screen as viewed from the user, for example, the display control device 1a can align the heights of the indication numbers corresponding to scale marks located at positions symmetrical to each other, as in the first embodiment. Further, the indication numbers are arranged at positions substantially inscribed in the reference circle. As a result, the numbers indicating the values corresponding to scale marks can be displayed in a well-balanced manner on a display device that displays a circular meter.

Further, the display area of the meter can be smoothly changed, and the layout positions of the number display rectangles 200 for displaying the indication numbers can be dynamically changed with this change in the display area. As a result, in a case where a plurality of meters is displayed on the display screen, for example, the meters can be displayed in a limited display area on the display screen in such a manner as to achieve both viewability of the meters and detailed display of a specific one of the meters.

The display control device 1a also includes the change range determining unit 19 that determines a change angle range for changing the intervals at which a plurality of scale marks on the reference circle 100 is assigned in the angle range. The scale mark position determining unit 13 determines the positions of a plurality of scale marks on the reference circle 100 for the change angle range. On the basis of the upper and lower limit values of the values to be measured by a circular meter in the change angle range, and the change angle range, the rectangle setting unit 14 specifies, of the plurality of scale marks, the number of scale marks at which indication numbers are to be displayed and the positions of the scale marks, and sets number display rectangles. Using a calculating formula in the change angle range, the rectangle position determining unit 15 determines the layout positions of the number display rectangles from the positions of the scale marks within the change angle range. The number display unit 16 is designed to have numbers displayed in the number display rectangles in the change angle range.

Thus, the assignment of the scale marks in the range of the values to be measured by the meter can be partially changed. Also, in that case, when the symmetrical axis extends in a vertical direction on the display screen as viewed from the user, for example, it is possible to align the heights of the indication numbers corresponding to scale marks located at positions symmetrical to each other.

Note that, within the scope of the present invention, the embodiments may be freely combined, modifications may be made to any component of the embodiments, or any component may be omitted from each embodiment.

INDUSTRIAL APPLICABILITY

A display control device according to the present invention is designed so that the numbers indicating the values corresponding to the scale marks to be displayed on a screen can be displayed in a well-balanced manner on a display device that displays a substantially circular meter. Thus, the display control device can be used as a display control device that causes a display screen to display a circular meter.

REFERENCE SIGNS LIST 1 and 1a: display control device,
2: display device,
11: reference information acquiring unit,
12: circle setting unit,
13: scale mark position determining unit,
14: rectangle setting unit,
15: rectangle position determining unit,
16: number display unit,
17: present value acquiring unit,
18: pointer display unit,
19: change range determining unit,
20: change instruction receiving unit,
100: reference circle,
111: angle acquiring unit,
112: upper limit value acquiring unit,
113: lower limit value acquiring unit,
200: number display rectangle,
1501: processing circuit,
1502: HDD,
1503: input interface device,
1504: output interface device,
1505: CPU, and
1506: memory

What is claimed is:

1. A display control device for displaying a circular meter on a display screen, the display control device comprising:
processing circuitry
to set a reference circle that serves as reference for a scale mark layout;
to determine a position of a scale mark on the reference circle,
to set a number display rectangle of a size corresponding to a number of digits of an indication number indicating a value corresponding to the scale mark;
to determine a layout position of the number display rectangle from the position of the scale mark, using a calculating formula that has been set on a basis of a size of the reference circle and the size of the number display rectangle; and to display a number in the number display rectangle,
wherein the calculating formula is designed so that, when a straight line extending through the center of the reference circle on the display screen is set as a symmetrical axis, the number display rectangles for displaying indication numbers indicating values corresponding to scale marks arranged at positions symmetrical to each other are located at the same position as viewed from a direction of the symmetrical axis, and each number display rectangle is located at a layout position inscribed in the reference circle, wherein:

the processing circuitry determines positions of a plurality of scale marks on the reference circle, for an angle range in which the scale marks are assigned to the circular meter, and the processing circuitry specifies, of the plurality of scale marks on the reference circle, a number of scale marks at which the indication numbers are to be displayed, and positions of the scale marks, on a basis of an upper limit value and a lower limit value of values to be measured by the circular meter, and the angle range, the processing circuitry determines a change angle range for changing intervals at which the plurality of scale marks on the reference circle is assigned in the angle range, the processing circuitry determines positions of the plurality of scale marks on the reference circle for the change angle range, on a basis of the upper limit value and the lower limit value of the values to be measured by the circular meter in the change angle range, and the change angle range, the processing circuitry specifies, of the plurality of scale marks, the number of scale marks at which the indication numbers are to be displayed and the positions of the scale marks, and sets the number display rectangles, using the calculating formula in the change angle range, the processing circuitry determines layout positions of the number display rectangles from the positions of the scale marks within the change angle range, and the processing circuitry has numbers displayed in the number display rectangles in the change angle range.

2. The display control device according to claim 1, wherein the processing circuitry sets one scale mark of the plurality of scale marks on the reference circle as a reference scale mark, and determines the change angle range so that a reference straight line connecting the reference scale mark to the center of the reference circle divides a center angle of the change angle range into equal parts.

3. The display control device according to claim 2, wherein the processing circuitry sets an enlargement instruction point that is a point on the opposite side of the center of the reference circle from the reference scale mark, the point being on a straight line that is the reference straight line extended from the center of the reference circle, and determines a center angle of the change angle range depending on a distance between the enlargement instruction point and the center of the reference circle.

4. The display control device according to claim 2, wherein the processing circuitry sets a point on the display screen as an enlargement instruction point, and determines a center angle of the change angle range depending on a continuous time during which the enlargement instruction point is pressed.

5. A display control method for displaying a circular meter on a display screen, the display control method comprising:

setting a reference circle that serves as reference for a scale mark layout;

determining a position of a scale mark on the reference circle;

setting a number display rectangle of a size corresponding to a number of digits of an indication number indicating a value corresponding to the scale mark;

determining a layout position of the number display rectangle from the position of the scale mark, using a calculating formula that has been set on a basis of a size of the reference circle and the size of the number display rectangle; and displaying a number in the number display rectangle, wherein the calculating formula is designed so that, when a straight line extending through the center of the reference circle on the display screen is set as a symmetrical axis, the number display rectangles for displaying indication numbers indicating values corresponding to scale marks arranged at positions symmetrical to each other are located at the same position as viewed from a direction of the symmetrical axis, and each number display rectangle is located at a layout position inscribed in the reference circle, wherein:

the determining of the layout position determines positions of a plurality of scale marks on the reference circle, for an angle range in which the scale marks are assigned to the circular meter, and the method further comprises specifying, of the plurality of scale marks on the reference circle, a number of scale marks at which the indication numbers are to be displayed, and positions of the scale marks, on a basis of an upper limit value and a lower limit value of values to be measured by the circular meter, and the angle range, wherein the method further comprises:

determining a change angle range for changing intervals at which the plurality of scale marks on the reference circle is assigned in the angle range, wherein the determining of the position of the scale mark determines positions of the plurality of scale marks on the reference circle for the change angle range, on a basis of the upper limit value and the lower limit value of the values to be measured by the circular meter in the change angle range, and the change angle range, specifying, of the plurality of scale marks, the number of scale marks at which the indication numbers are to be displayed and the positions of the scale marks, and sets the number display rectangles, using the calculating formula in the change angle range, determining layout positions of the number display rectangles from the positions of the scale marks within the change angle range, and the displaying the number in the number display rectangle include displaying numbers in the number display rectangles in the change angle range.

6. A non-transitory computer readable medium having stored therein a display control program for causing a processor to display a circular meter on a display screen, the display control program causing the computer to execute:

setting a reference circle that serves as reference for a scale mark layout;

determining a position of a scale mark on the reference circle;

setting a number display rectangle of a size corresponding to a number of digits of an indication number indicating a value corresponding to the scale mark;

determining a layout position of the number display rectangle from the position of the scale mark, using a calculating formula that has been set on a basis of a size of the reference circle and the size of the number display rectangle; and displaying a number in the number display rectangle, wherein the calculating formula is designed so that, when a straight line extending through the center of the reference circle on the display screen is set as a symmetrical axis, the number display rectangles for displaying indication numbers indicating values corresponding to scale marks arranged at positions symmetrical to each other are located at the same position as viewed from a direction of the symmetrical axis, and each number display rectangle is located at a layout position inscribed in the reference circle, wherein:

the determining of the layout position determines positions of a plurality of scale marks on the reference circle, for an angle range in which the scale marks are assigned to the circular meter, and the display control program further causes the computer to execute:

specifying, of the plurality of scale marks on the reference circle, a number of scale marks at which the indication numbers are to be displayed, and positions of the scale marks, on a basis of an upper limit value and a lower limit value of values to be measured by the circular meter, and the angle range; and determining a change angle range for changing intervals at which the plurality of scale marks on the reference circle is assigned in the angle range, wherein the determining of the position of the scale mark determines positions of the plurality of scale marks on the reference circle for the change angle range, on a basis of the upper limit value and the lower limit value of the values to be measured by the circular meter in the change angle range and the change angle range, specifying, of the plurality of scale marks, the number of scale marks at which the indication numbers are to be displayed and the positions of the scale marks, and sets the number display rectangles, using the calculating formula in the change angle range, determining layout positions of the number display rectangles from the positions of the scale marks within the change angle range, and the displaying the number in the number display rectangle include displaying numbers in the number display rectangles in the change angle range.

7. The display control method according to claim 5, further comprising:

setting one scale mark of the plurality of scale marks on the reference circle as a reference scale mark; and determining the change angle range so that a reference straight line connecting the reference scale mark to the center of the reference circle divides a center angle of the change angle range into equal parts.

8. The display control method according to claim 7, further comprising:

setting an enlargement instruction point that is a point on the opposite side of the center of the reference circle from the reference scale mark, the point being on a straight line that is the reference straight line extended from the center of the reference circle, and determines a center angle of the change angle range depending on a distance between the enlargement instruction point and the center of the reference circle.

9. The display control method according to claim 7, further comprising:

setting a point on the display screen as an enlargement instruction point; and determining a center angle of the change angle range depending on a continuous time during which the enlargement instruction point is pressed.

\* \* \* \* \*